(12) United States Patent
Take

(10) Patent No.: US 8,199,415 B2
(45) Date of Patent: *Jun. 12, 2012

(54) ZOOM LENS SYSTEM, OPTICAL DEVICE WITH ZOOM LENS SYSTEM, AND METHOD OF MANUFACTURING ZOOM LENS SYSTEM

(75) Inventor: Toshinori Take, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/984,908

(22) Filed: Jan. 5, 2011

(65) Prior Publication Data

US 2011/0096409 A1    Apr. 28, 2011

Related U.S. Application Data

(63) Continuation of application No. 12/277,760, filed on Nov. 25, 2008, now Pat. No. 7,889,439.

(30) Foreign Application Priority Data

Nov. 29, 2007    (JP) .................................. 2007-308322

(51) Int. Cl.
*G02B 15/14*    (2006.01)
(52) U.S. Cl. ........................................ 359/690; 359/676
(58) Field of Classification Search .................. 359/676, 359/687, 690; 396/72–88; 348/240.99–240.3, 348/335–369
See application file for complete search history.

(56) References Cited

U.S. PATENT DOCUMENTS

| 5,061,053 A | 10/1991 | Hirakawa |
| 5,572,276 A | 11/1996 | Hirakawa |
| 6,825,990 B2 | 11/2004 | Yoshimi et al. |
| 7,158,315 B2 | 1/2007 | Shibayama |
| 7,336,429 B2 | 2/2008 | Shibayama |
| 7,889,439 B2 * | 2/2011 | Take ............................ 359/690 |

FOREIGN PATENT DOCUMENTS

| JP | 06-051202 A | 2/1994 |
| JP | 7-140386 A | 6/1995 |
| JP | 2691563 B2 | 9/1997 |
| JP | 2004-109559 A | 4/2004 |
| JP | 2004-109993 A | 4/2004 |

* cited by examiner

*Primary Examiner* — Darryl J Collins
(74) *Attorney, Agent, or Firm* — Miles & Stockbridge P.C.

(57) ABSTRACT

A zoom lens system comprises, in order from an object, a first lens group having a positive refractive power, a second lens group having a negative refractive power, and a third lens group having a positive refractive power. The first lens group has a first-a partial lens group and a first-b partial lens group arranged on an image side of the first-a partial lens group with an air space and is constructed such that the first-b partial lens group moves along an optical axis direction upon focusing from infinity to a close-range object. The third lens group is constituted by a third-a partial lens group having a positive refractive power and a third-b partial lens group having a negative refractive power arranged on the image side of the third-a partial lens group with an air space.

15 Claims, 22 Drawing Sheets

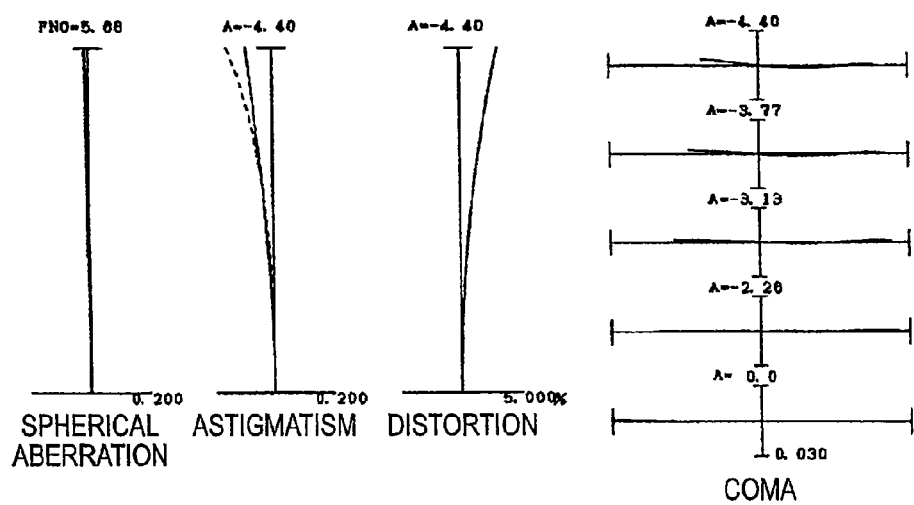

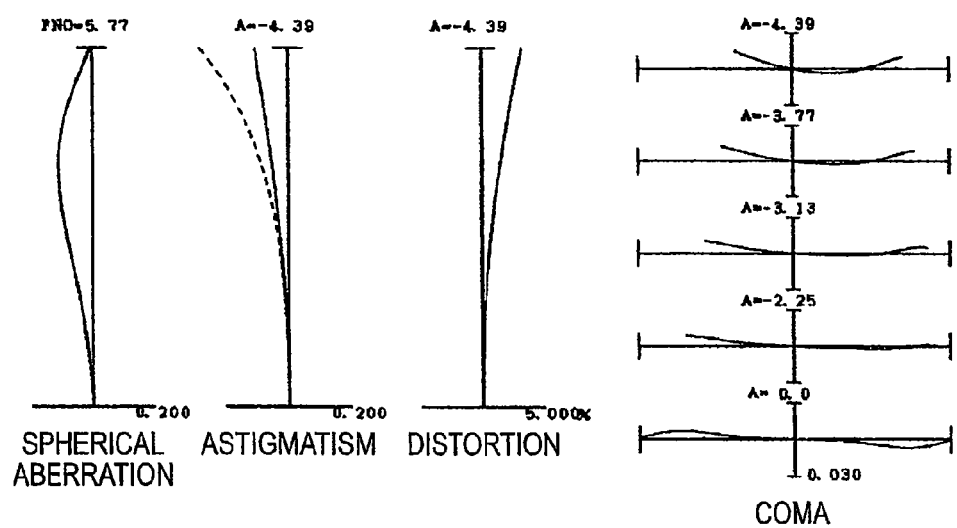

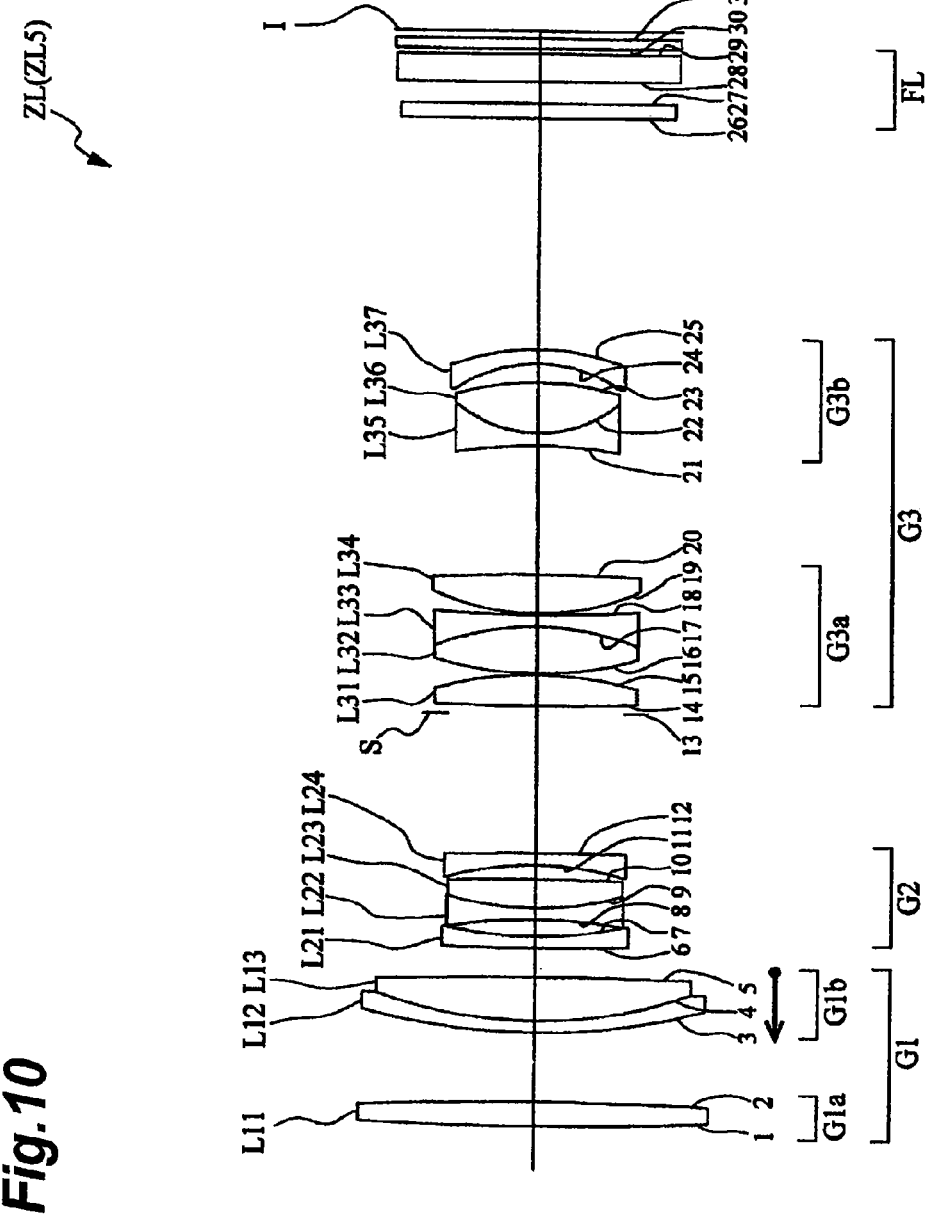

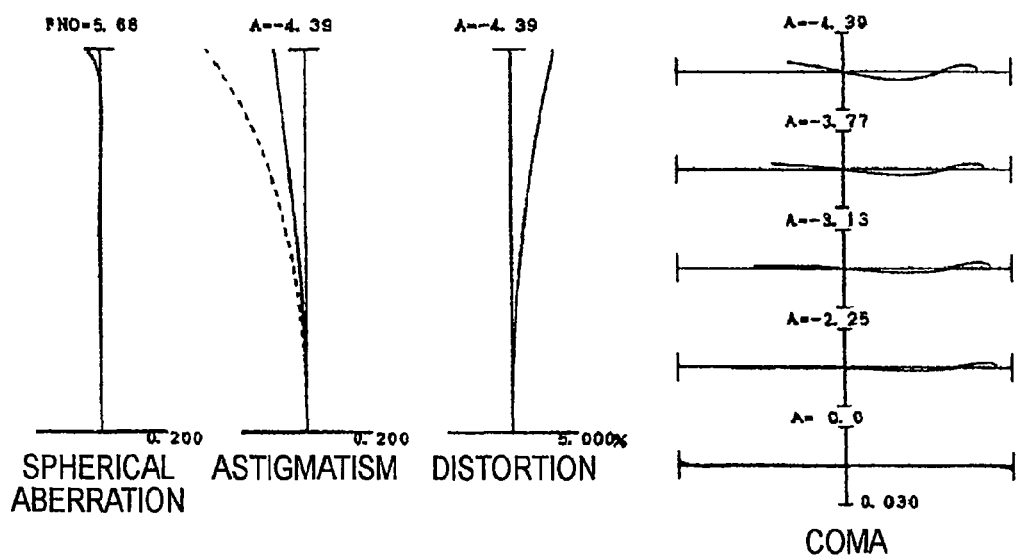

ZOOM LENS SYSTEM, OPTICAL DEVICE WITH ZOOM LENS SYSTEM, AND METHOD OF MANUFACTURING ZOOM LENS SYSTEM

CROSS-REFERENCE TO RELATED APPLICATION

This application is a continuation of application Ser. No. 12/277,760 filed Nov. 25, 2008 (now U.S. Pat. No. 7,889,439).

BACKGROUND OF THE INVENTION

1. Field of the Invention

The present invention relates to a zoom lens system used in an optical device such as digital still camera.

2. Related Background Art

A positive-negative-positive zoom lens system has conventionally been known. This positive-negative-positive zoom lens system is constituted by three lens groups of a first lens group having a positive refractive power, a second lens group having a negative refractive power, and a third lens group having a positive refractive power in order from an object. Upon zooming from a wide-angle end state (where the focal length is the shortest) to a telephoto end state (where the focal length is the longest), the distance between the first lens group and the second lens group increases, the distance between the second lens group and the third lens group decreases, and the first lens group moves toward the object. For focusing, the first lens group as a whole is moved along the optical axis (see, for example, Japanese Patent Publication No. 2691563).

SUMMARY OF THE INVENTION

However, such a conventional zoom lens system has been problematic in that, in the case where the lens group closest to the object as a whole is used for focusing, the length of the zoom lens system becomes longer when adjusting a focus onto the close-range object. It has also been problematic in that the outer diameter of a lens in the zoom lens system becomes greater in order to move the focal lens group along the optical axis.

In view of such problems, it is an object of the present invention to provide a zoom lens system which has a small size and can attain high imaging performances while having a variable power ratio of about 3.5.

For purposes of summarizing the invention, certain aspects, advantages, and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessary achieving other advantages as may be taught or suggested herein.

In one aspect, the zoom lens system in accordance with the present invention comprises: in order from an object, a first lens group having a positive refractive power; a second lens group having a negative refractive power; and a third lens group having a positive refractive power; wherein the first lens group has a first-a partial lens group and a first-b partial lens group arranged on an image side of the first-a partial lens group with an air space and is constructed such that the first-b partial lens group moves along an optical axis direction upon focusing from infinity to a close-range object; wherein the third lens group comprises a third-a partial lens group having a positive refractive power and a third-b partial lens group having a negative refractive power arranged on the image side of the third-a partial lens group with an air space.

In another aspect, the zoom lens system in accordance with the present invention comprises, in order from an object: a first lens group having a positive refractive power; a second lens group having a negative refractive power; and a third lens group having a positive refractive power; wherein the first lens group has a first-a partial lens group and a first-b partial lens group arranged on an image side of the first-a partial lens group with an air space and is constructed such that the first-b partial lens group moves along an optical axis direction upon focusing from infinity to a close-range object; and wherein an image-side surface of a lens component arranged closest to an image is distanced from an image plane by at least 10 mm but not more than 30 mm.

Preferably, the zoom lens system in accordance with the present invention is constructed such as to satisfy the following conditional expression:

$$0.17 < |f1b|/|f1a| < 0.51$$

where $f1a$ denotes a focal length of the first-a partial lens group, and $f1b$ denotes a focal length of the first-b partial lens group.

Preferably, the zoom lens system in accordance with the present invention is constructed such as to satisfy the following conditional expression:

$$1.7 < f1/fw < 2.6$$

where $f1$ denotes a focal length of the first lens group, and $fw$ denotes a focal length of the whole system at a wide-angle end state.

Preferably, the zoom lens system in accordance with the present invention is constructed such as to satisfy the following conditional expression:

$$1.15 < |f1b|/f1 < 1.50$$

where $f1$ denotes the focal length of the first lens group, and $f1b$ denotes the focal length of the first-b partial lens group.

Preferably, in the zoom lens system in accordance with the present invention, the first-a partial lens group in the first lens group is stationary with respect to an image plane upon focusing from a close-range object to infinity.

Preferably, in the zoom lens system in accordance with the present invention, the first-a partial lens group in the first lens group is constructed such as to have a positive refractive power.

Preferably, in the zoom lens system in accordance with the present invention, the first-b partial lens group in the first lens group is constructed such as to have a positive refractive power.

Preferably, the zoom lens system in accordance with the present invention is constructed such as to satisfy the following conditional expression:

$$2.73 < f1/(-f2) < 6.20$$

where $f1$ denotes the focal length of the first lens group, and $f2$ denotes a focal length of the second lens group.

Preferably, the zoom lens system in accordance with the present invention is constructed such as to satisfy the following conditional expression:

$$2.74 < f1/f3 < 5.14$$

where $f1$ denotes the focal length of the first lens group, and $f3$ denotes a focal length of the third lens group.

Preferably, in the zoom lens system in accordance with the present invention, the third-b partial lens group in the third lens group is composed, in order from the object, of a cemented negative lens and a negative lens.

Preferably, in this case, the negative lens in the third-b partial lens group in the third lens group is a negative meniscus lens having a convex surface facing the image.

Preferably, the zoom lens system in accordance with the present invention is constructed such that at least the first and third lens groups move toward the object upon zooming from a wide-angle end state to a telephoto end state.

Preferably, the zoom lens system in accordance with the present invention is constructed such that, upon zooming from a wide-angle end state to a telephoto end state, a distance between the first and second lens groups increases while a distance between the second and third lens groups decreases.

The optical device in accordance with the present invention (e.g., digital still camera 1 in accordance with an embodiment) is equipped with any of the above-mentioned zoom lens systems forming an image of the object onto a predetermined image plane.

In one aspect, the method of manufacturing a zoom lens system in accordance with the present invention comprises the steps of arranging, in order from an object, a first lens group having a positive refractive power and including a first-a partial lens group and a first-b partial lens group arranged on an image side of the first-a partial lens group with an air space, a second lens group having a negative refractive power, and a third lens group having a positive refractive power; and verifying a focusing action of moving the first-b partial lens group along an optical axis direction, the first-b partial lens group being adapted to focus from infinity to a close-range object; wherein the third lens group comprises a third-a partial lens group having a positive refractive power and a third-b partial lens group having a negative refractive power arranged on the image side of the third-a partial lens group with an air space; wherein the third-a partial lens group in the third lens group has; and wherein the third-b partial lens group in the third lens group has.

In another aspect, the method of manufacturing a zoom lens system in accordance with the present invention comprises the steps of arranging, in order from an object, a first lens group having a positive refractive power and including a first-a partial lens group and a first-b partial lens group arranged on an image side of the first-a partial lens group with an air space, a second lens group having a negative refractive power, and a third lens group having a positive refractive power; and verifying a focusing action of moving the first-b partial lens group along an optical axis direction, the first-b partial lens group being adapted to focus from infinity to a close-range object; wherein an image-side surface of a lens component arranged closest to the image is distanced from an image plane by at least 10 mm but not more than 30 mm.

When the zoom lens system in accordance with the present invention and the optical device equipped with the zoom lens system are constructed as in the foregoing, a zoom lens system having a small size and high imaging performances while exhibiting a high variable power ratio can be realized concerning a zoom lens system suitable for video cameras, digital still cameras, and the like using solid-state imaging devices and the like.

BRIEF DESCRIPTION OF THE DRAWINGS

FIG. 5C is an aberration chart in Example 2 in the telephoto end state upon focusing at infinity;

FIG. 7C is an aberration chart in Example 3 in the telephoto end state upon focusing at infinity;

FIG. 10 is a sectional view showing the structure of the zoom lens system in accordance with Example 5;

FIG. 13C is an aberration chart in Example 6 in the telephoto end state upon focusing at infinity;

DESCRIPTION OF THE PREFERRED EMBODIMENTS

In the following, preferred embodiments of the present invention will be explained with reference to the drawings. First, the structure of a zoom lens system ZL in accordance with an embodiment will be explained with reference to FIG. 2. This zoom lens system ZL comprises, in order from an object, a first lens group G1 having a positive refractive power, a second lens group G2 having a negative refractive power, and a third lens group G3 having a positive refractive power. Upon zooming from the wide-angle end state (where the focal length is the shortest) to the telephoto end state (where the focal length is the longest), at least the first lens group G1 and third lens group G3 move toward the object so as to increase the distance between the first lens group G1 and second lens group G2 and decrease the distance between the second lens group G2 and third lens group G3. In the zoom lens system ZL, the first lens group G1 is constituted by a first-a partial lens group G1a and a first-b partial lens group G1b, while the first-b partial lens group G1b is arranged on the image side of the first-a partial lens group G1a with an air space therebetween. This zoom lens system ZL can attain an excellent imaging performance with a variable power ratio of about 3.5 or higher.

Functions of the lens groups G1 to G3 will now be explained. The first lens group G1 acts to converge luminous fluxes. In the wide-angle end state, the first lens group G1 is arranged as close as possible to an image surface so that off-axis luminous fluxes pass therethrough on the outside of the optical axis, whereby the lens diameter of the first lens group G1 is made smaller. In the telephoto end state, the first lens group G1 is moved toward the object so as to greatly increase the distance from the second lens group G2, thus enhancing the converging action, whereby the length of the lens system is shortened.

Figure 2:
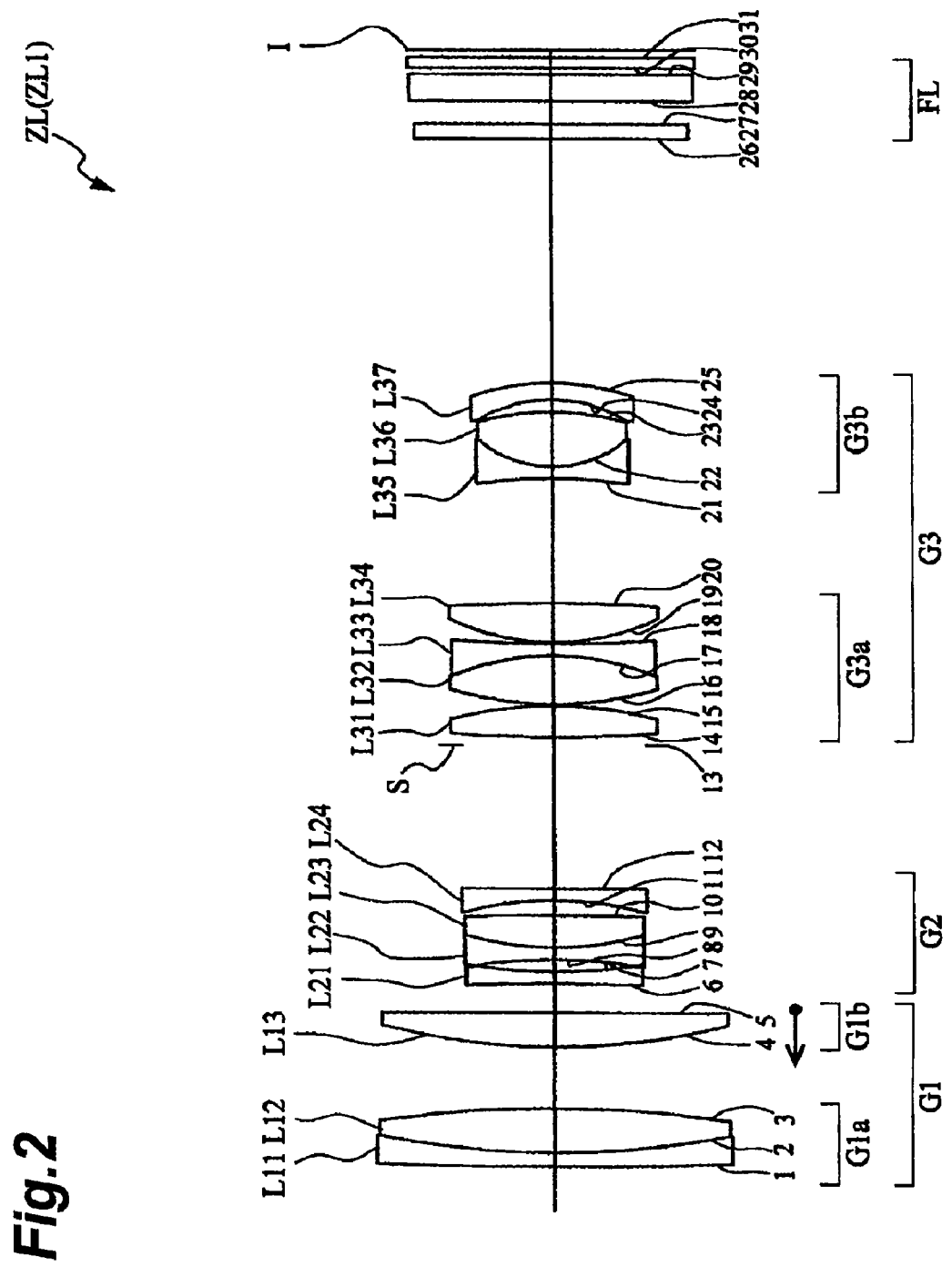
FIG. 2 is a sectional view showing the structure of the zoom lens system in accordance with Example 1.

In this embodiment, the first lens group G1 has the first-a partial lens group G1a and the first-b partial lens group G1b arranged on the image side of the first-a partial lens group with an air space therebetween, and is constructed such that the first-b partial lens group G1b moves along an optical axis direction as indicated by an arrow in FIG. 2 upon focusing from infinity to a close-range object. The black point shown in FIG. 2 indicates the in-focus state at infinity, and moves in the direction of the depicted arrow when adjusting the focus onto the close-range object, whereby focus adjustment is done. Such a configuration causes the first-b partial lens group G1b to perform focusing while keeping the first-a partial lens group G1a stationary with respect to the image surface, thus minimizing the amount of movement upon focusing. Changes in performances caused by focusing are also minimized.

The second lens group G2 acts to enlarge an image of the object formed by the first lens group G1. As the lens position state changes from the wide-angle end state to the telephoto end state, the distance between the first lens group G1 and second lens group G2 is increased, so as to enhance the magnifying power, thereby changing the focal length.

The third lens group G3 acts to converge luminous fluxes expanded by the second lens group G2. For achieving higher performances, it will be preferred if the third lens group G3 is constituted by a plurality of lens groups. The third lens group G3 also controls the exit pupil position.

Based on the structure mentioned above, the zoom lens system ZL in accordance with this embodiment is constructed such as to satisfy the following conditional expression (1):

$$0.17 < |f1b|/f1a| < 0.51 \tag{1}$$

where f1a denotes a focal length of the first-a partial lens group G1a, and f1b denotes a focal length of the first-b partial lens group G1b.

Conditional expression (1) is one for defining an appropriate range for the ratio between focal lengths of the first-a partial lens group G1a and first-b partial lens group G1b in the first lens group G1. When the ratio exceeds the upper limit of conditional expression (1), it is unfavorable in that the refractive power of the first-b partial lens group G1b is so strong that the spherical aberration generated by the first lens group G1 alone becomes large. When the ratio is less than the lower limit of conditional expression (1), on the other hand, it is unfavorable in that the refractive power of the first-b partial lens group G1b is so weak that the spherical aberration generated by the first lens group G1 alone is short of correction.

For securing the effects of this embodiment, it will be preferred if the upper limit of conditional expression (1) is 0.47. For securing the effects of this embodiment more, it will be more preferred if the upper limit of conditional expression (1) is 0.45. For securing the effects of this embodiment further, it will be further preferred if the upper limit of conditional expression (1) is 0.43 or 0.40. For securing the effects of this embodiment, it will be preferred if the lower limit of conditional expression (1) is 0.2. For securing the effects of this embodiment more, it will be more preferred if the lower limit of conditional expression (1) is 0.22. For securing the effects of this embodiment further, it will be further preferred if the lower limit of conditional expression (1) is 0.24.

Preferably, the zoom lens system ZL in accordance with this embodiment is constructed such as to satisfy the following conditional expression (2):

$$1.7 < f1/fw < 2.6 \tag{2}$$

where f1 denotes a focal length of the first lens group G1, and fw denotes a focal length of the whole system at a wide-angle end state.

Conditional expression (2) is one for defining an appropriate range for the ratio between the focal length of the whole lens system and the focal length of the first lens group G1 in the wide-angle end state. When the ratio exceeds the upper limit of conditional expression (2), it is unfavorable in that the refractive power of the first lens group is so weak that the spherical aberration generated by the first lens group G1 alone is short of correction. It is also unfavorable in that the length of the lens system becomes too long to achieve the object of the invention. When the ratio is less than the lower limit of conditional expression (2), on the other hand, it is unfavorable in that the refractive power of the first lens group G1 is so strong that the spherical aberration generated by the first lens group G1 alone becomes large.

For securing the effects of this embodiment, it will be preferred if the upper limit of conditional expression (2) is 2.55. For securing the effects of this embodiment more, it will be more preferred if the upper limit of conditional expression (2) is 2.5. For securing the effects of this embodiment, it will be preferred if the lower limit of conditional expression (2) is 1.75. For securing the effects of this embodiment more, it will be more preferred if the lower limit of conditional expression (2) is 1.8.

Preferably, the zoom lens system ZL in accordance with this embodiment is constructed such as to satisfy the following conditional expression (3):

$$1.15 < |f1b|/f1 < 1.50 \tag{3}$$

where f1 denotes the focal length of the first lens group G1, and f1b denotes the focal length of the first-b partial lens group f1b.

Conditional expression (3) is one for defining an appropriate range for the ratio between focal lengths of the first lens group G1 and first-b partial lens group G1b. When the ratio exceeds the upper limit of conditional expression (3), the refractive power of the first-b partial lens group G1b becomes weak. It is also unfavorable in that the amount of movement of focusing increases so much that the length of the lens system becomes longer, whereby the object of the present invention may not be obtained. Further, coma fluctuates greatly at the time of focusing, whereby higher performances may not be achieved. When the ratio is less than the lower limit of conditional expression (3), on the other hand, it is unfavorable in that the refractive power of the first-b partial lens group G1b is so strong that the spherical aberration and coma generated by the first lens group G1 alone become large.

For securing the effects of this embodiment, it will be preferred if the upper limit of conditional expression (3) is 1.48. For securing the effects of this embodiment more, it will be more preferred if the upper limit of conditional expression (3) is 1.46. For securing the effects of this embodiment, it will be preferred if the lower limit of conditional expression (3) is 1.17. For securing the effects of this embodiment more, it will be more preferred if the lower limit of conditional expression (3) is 1.19.

Preferably, in the zoom lens system ZL in accordance with this embodiment, the first-a partial lens group G1a in the first lens group G1 is stationary with respect to the image surface when the lens position state changes from a state focused at a short distance to a state focused at infinity, namely upon focusing from a close-range object to infinity.

Preferably, in the zoom lens system ZL in accordance with this embodiment, the first-a partial lens group G1a in the first lens group G1 has a positive refractive power in order to minimize fluctuations of spherical aberration upon zooming and focusing.

Preferably, in the zoom lens system ZL in accordance with this embodiment, the first-b partial lens group G1b in the first lens group G1 has a positive refractive power in order to minimize fluctuations of spherical aberration upon zooming and focusing.

Preferably, the zoom lens system ZL in accordance with this embodiment satisfies the following conditional expression (4):

$$2.73 < f1/(-f2) < 6.20 \tag{4}$$

where f1 denotes the focal length of the first lens group, and f2 denotes a focal length of the second lens group.

Conditional expression (4) is one for defining an appropriate range for the ratio between focal lengths of the first lens group G1 and second lens group G2. When the ratio exceeds the upper limit of conditional expression (4), the refractive power of the first lens group G1 becomes relatively weak, so that the first lens group G1 fails to effectively contribute to varying power. Also, the amount of movement of the first lens group G1 becomes large, thereby enhancing fluctuations of spherical aberration occurring in the first lens group G1 at the time of zooming. As a result, performances are hard to keep from lowering in the whole zoom range from the wide-angle end state to the telephoto end state. It is further unfavorable in that the refractive power of the second lens group G2 is relatively so strong that coma cannot be restrained from occurring, whereby high optical performances may not be obtained. When the ratio is less than the lower limit of conditional expression (4), on the other hand, the refractive power of the second lens group G2 becomes so weak that coma and field curvature are short of correction. It is also unfavorable in that the second lens group G2 fails to effectively contribute to varying power, whereby a high variable power ratio of 3.5 or more may not be secured.

For securing the effects of this embodiment, it will be preferred if the upper limit of conditional expression (4) is 6.0. For securing the effects of this embodiment more, it will be more preferred if the upper limit of conditional expression (4) is 5.8. For securing the effects of this embodiment, it will be preferred if the lower limit of conditional expression (4) is 2.9. For securing the effects of this embodiment more, it will be more preferred if the lower limit of conditional expression (4) is 3.1.

Preferably, the zoom lens system ZL in accordance with this embodiment satisfies the following conditional expression (5):

$$2.74 < f1/f3 < 5.14 \tag{5}$$

where f1 denotes the focal length of the first lens group G1, and f3 denotes a focal length of the third lens group G3.

Conditional expression (5) is one for defining an appropriate range for the ratio between focal lengths of the first lens group G1 and third lens group G3. When the ratio exceeds the upper limit of conditional expression (5), it is unfavorable in that the refractive power of the third lens group G3 is so weak that coma is hard to correct, whereby high optical performances may not be obtained. When the ratio is less than the lower limit of conditional expression (5), on the other hand, it is unfavorable in that the refractive power of the third lens group G3 is so strong that spherical aberration is corrected in excess.

For securing the effects of this embodiment, it will be preferred if the upper limit of conditional expression (5) is 5.0. For securing the effects of this embodiment more, it will be more preferred if the upper limit of conditional expression (5) is 4.8. For securing the effects of this embodiment, it will be preferred if the lower limit of conditional expression (5) is 3.4. For securing the effects of this embodiment more, it will be more preferred if the lower limit of conditional expression (5) is 3.2.

For further higher performances, it will be preferred in the zoom lens system ZL in accordance with this embodiment if the third lens group G3 is constructed as follows. That is, for favorably correcting the spherical aberration, coma, and field curvature generated by the third lens group G3 alone, the third lens group G3 is preferably constituted by a third-a partial lens group G3a and a third-b partial lens group G3b arranged on the image side of the third-a partial lens group G3a with an air space therebetween. Here, the third-a partial lens group G3a and third-b partial lens group G3b are separated from each other by a gap yielding the widest air space between lenses within the third lens group G3.

For further higher performances and smaller size, it will be preferred in the zoom lens system ZL in accordance with this embodiment if the third lens group G3 is constructed as follows. That is, for favorably correcting the spherical aberration, coma, and field curvature generated by the third lens group G3 alone, the third-a and third-b partial lens groups G3a, G3b have positive and negative refractive powers, respectively. Thus placing third-a and third-b partial lens groups G3a, G3b in an appropriate refractive power arrangement can contribute to shortening the length of the lens system and distancing the exit pupil.

Preferably, in this case, the third-b partial lens group G3b has two negative lens components. More preferably, all the lens components included in the third-b partial lens group G3b have a negative refractive power. Such a configuration can adjust the position of the exit pupil of the zoom lens system ZL, so as to prevent darkness (shading) from occurring at corners of a taken picture and shorten the length of the zoom lens.

Preferably, the zoom lens system ZL in accordance with this embodiment is a so-called telephoto zoom lens system including long focal lengths such as about 80 mm at the wide-angle end and about 300 mm at the telephoto end in terms of 35-mm film format. More preferably, the zoom lens system ZL in accordance with this embodiment has a variable power ratio of about 3 to 4. More preferably, in the zoom lens system ZL in accordance with this embodiment, the distance from the image-side surface of the lens component arranged closest to the image to the image surface in the shortest state (the wide-angle end state in each of examples which will be explained later) is about 10 to 30 mm.

For further higher performances, it will be preferred in the zoom lens system ZL in accordance with this embodiment if the third lens group G3 is constructed as follows. That is, for favorably correcting coma and distancing the exit pupil, the third lens group is preferably constituted by a cemented negative lens and a negative meniscus lens having a convex surface facing the image in order from the object.

For further higher performances, it will be preferred in the zoom lens system ZL in accordance with this embodiment if the first lens group G1 is constructed as follows. That is, one of the first-a partial lens group G1a and first-b partial lens group G1b in the first lens group G1 is preferably a single lens component, while the other is more preferably a cemented lens component. Such a configuration allows the cemented lens component to correct chromatic aberration. This can also evade fluctuations in chromatic aberration which may occur when moving the lens group if each of the partial lens groups is a cemented lens component, and reduce the weight of the first lens group. More preferably, the number of lens components constituting the first lens group G1 is 3 or less.

Figure 16:
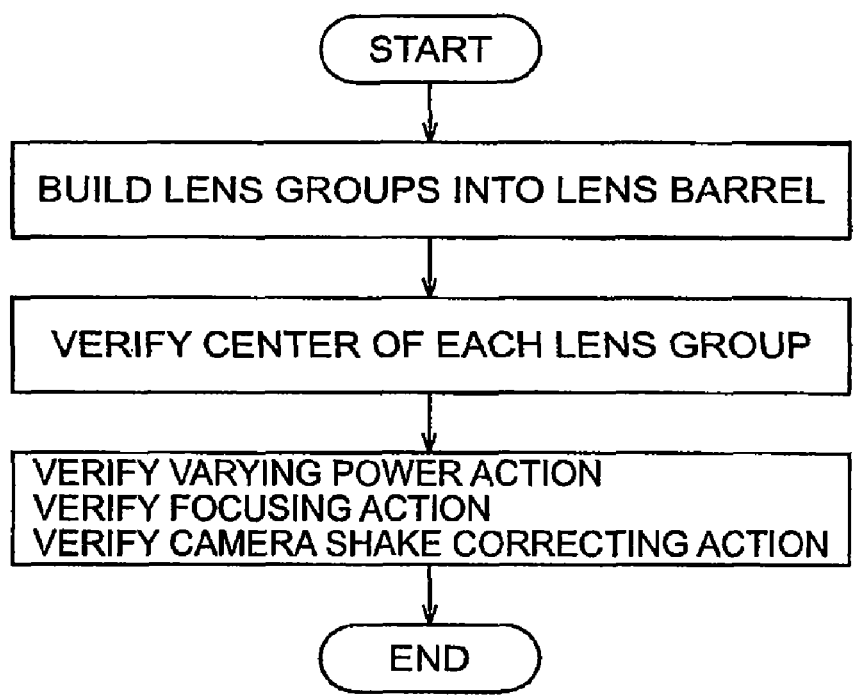
FIG. 16 is a flowchart showing a method of manufacturing the zoom lens system in accordance with an embodiment of the present invention.

An outline of a method of manufacturing the zoom lens system will now be explained with reference to FIG. 16.

To begin with, the first lens group G1, second lens group G2, and third lens group G3 of this embodiment are built into a cylindrical lens barrel. The lens groups may be built into the lens barrel one by one in their order along the optical axis, or a part or all of the lens groups may be integrally held with a holding member and then assembled with a lens barrel member. Preferably, after the lens groups are built into the lens barrel, it is determined whether or not an image of an object is formed in the state where the lens groups are built in the lens barrel.

After the zoom lens system is assembled as mentioned above, its various actions are verified. Examples of the actions include a focusing action in which the first-a partial lens group G1b for adjusting a focus from infinity to the close-range object moves along the optical axis, a varying power action in which at least a part of lens groups moves along the optical axis when varying power, and a camera shake correcting action in which at least a part of lenses moves so as to have a component orthogonal to the optical axis. When varying power from the wide-angle end state to the telephoto end state in this embodiment, at least the first and third lens groups move toward the object such as to increase the distance between the first and second lens groups and decrease the distance between the second and third lens groups. The various actions can be verified in any order.

The optical device in accordance with an embodiment will now be explained. This optical device is an optical device equipped with a zoom lens system for forming an image of an object onto a predetermined image surface, wherein the zoom lens system is constituted by the zoom lens system ZL in accordance with the embodiment.

Figure 14A:
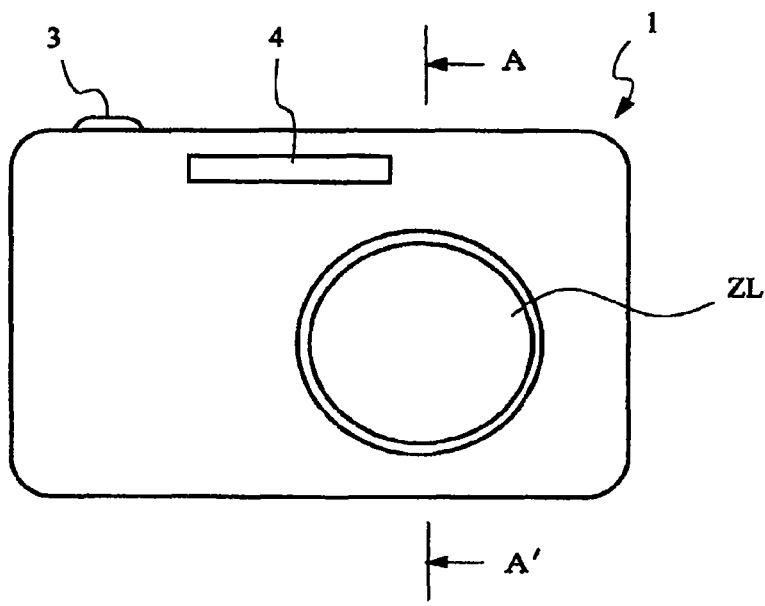
FIG. 14A is a front view of an digital still camera mounted with the zoom lens system in accordance with an example of the present invention.
Figure 14B:
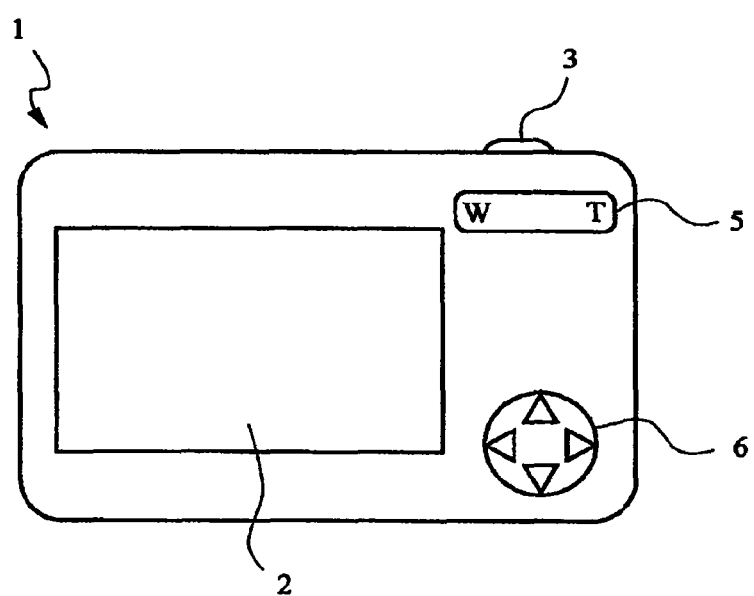
FIG. 14B is a rear view of the digital still camera mounted with the zoom lens system in accordance with the embodiment of the present invention.
Figure 15:
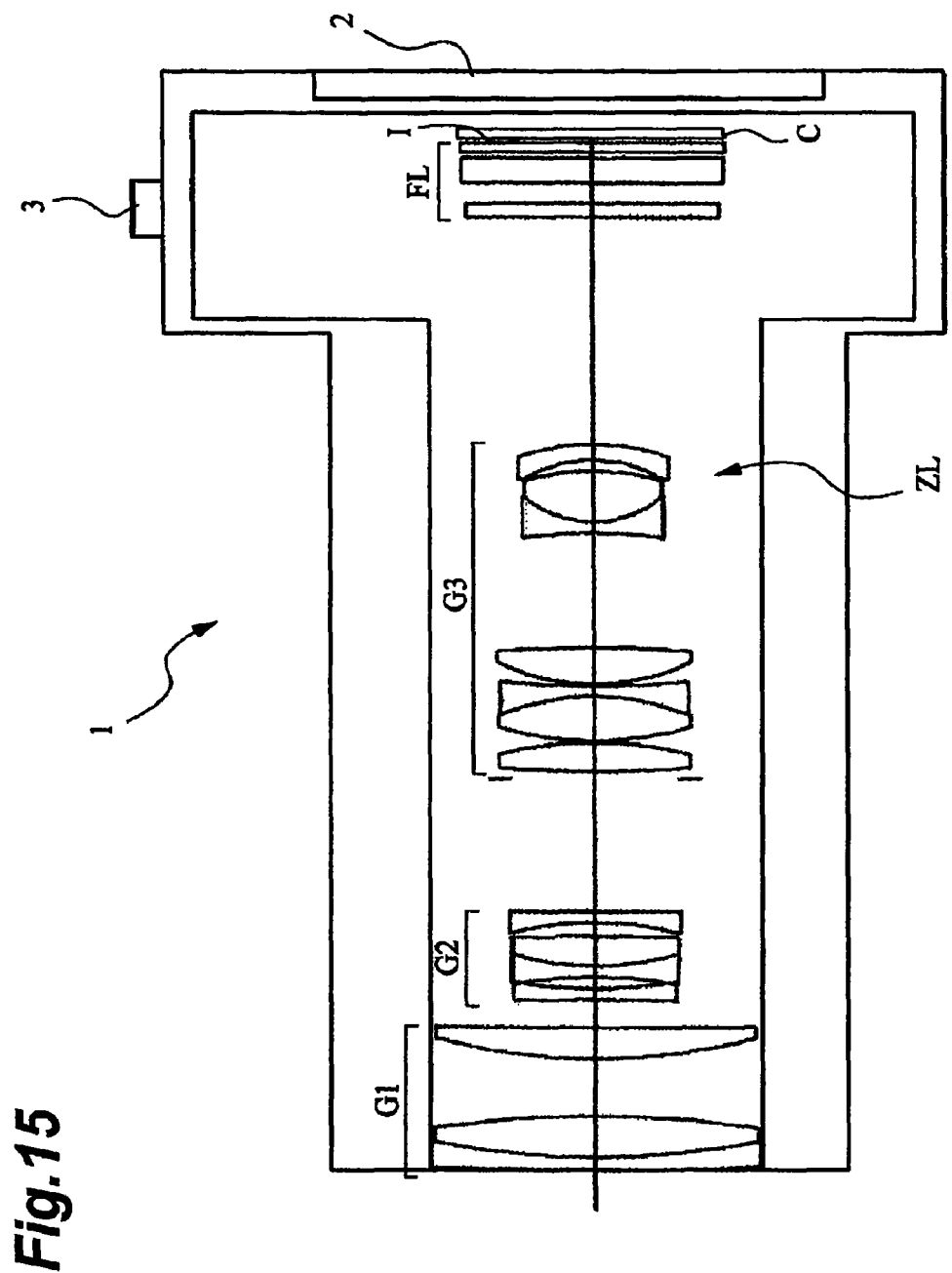
FIG. 15 is a sectional view taken along the line A-A' of FIG. 14A.

FIGS. 14A, 14B, and 15 show the structure of an digital still camera (hereinafter simply referred to as camera) 1 as an optical device detachably equipped with the above-mentioned zoom lens system ZL. When an undepicted power button is pressed in this camera 1, an undepicted shutter of its shooting lens system (zoom lens system ZL) is released, so that light from an undepicted object is converged by the zoom lens system ZL, so as to form an image on an imaging device C (e.g., CCD or CMOS) arranged at an image surface I. The object image formed on the imaging device C is displayed on a liquid crystal monitor 2 arranged behind the camera 1. After deciding a composition of the object image while viewing the liquid crystal monitor 2, a photographer pushes down a release button 3, so as to capture the object image with the imaging device C and record it into an undepicted memory for storage.

Arranged in the camera 1 are an auxiliary light emitting part 4 for emitting auxiliary light when the object is dark, a wide (W)—telephoto (T) button 5 for zooming the zoom lens system ZL from the wide-angle end state (W) to the telephoto end state (T), a function button 6 used for setting various conditions and the like of the camera 1, and the like.

Though the above explanations and examples which will follow illustrate the zoom lens system ZL having a three-group structure, the foregoing structural conditions and the like are also applicable to other group structures such as those composed of four and five groups. For example, while the lens system is constructed by three movable groups in this embodiment, additional lens groups may be inserted between the existing lens groups or arranged adjacent thereto on the image side or object side. The lens groups refers to parts, separated from each other by an air space which varies at the time of varying power, each having at least one lens.

A single or plurality of lens groups or partial lens groups may be moved in the optical axis direction as a focusing lens group for focusing from an object at infinity to a close-range object. In this case, the focusing lens group is employable for autofocusing and suitable for being driven with a motor (such as ultrasonic motor) for autofocusing. It will be preferred in particular if at least a part of the first lens group is employed as the focusing lens group.

In order to prevent shooting from failing because of image blurs caused by camera shakes and the like which are likely to occur in a zoom lens system having a high variable power, the present invention can combine a shake detection system for detecting shakes of the lens system and driving means with the lens system and drive the whole or part of one of the lens groups constituting the lens system as a vibration reduction lens with the driving means such that the vibration reduction lens group is decentered so as to correct image blurs (fluctuations in the image surface position) due to shakes of the lens system detected by the shake detection system, thus shifting the image, thereby correcting the image blurs. It will be preferred in particular if the second lens group G2 as a whole is the vibration reduction lens group. Thus, the zoom lens system ZL in accordance with this embodiment can function as a so-called vibration reduction optical system. In this embodiment, however, the lenses within the third lens group G3 move only in directions parallel to the optical axis. That is, the third lens group G3 in this embodiment has no lenses which move in directions perpendicular to the optical axis and thus fails to function as a vibration reduction optical system.

The lens surfaces may be formed spherical, planar, or aspherical. The spherical or planar lens surfaces are favorable in that processing of lenses and adjustment of their assembling are easy, so as to prevent optical performances from deteriorating because of errors in the processing and adjustment of assembling. They are also favorable in that depicting performances deteriorate less even when the image surface is shifted. On the other hand, the aspherical lens surfaces may be any of those made by grinding, glass-molded aspherical surfaces in which glass is formed aspherical with molds, and composite aspherical surfaces in which a resin is formed aspherical on a surface of glass. The lens surfaces may also be diffractive surfaces. The lenses may be gradient-index lenses (GRIN lenses) or plastic lenses.

Though an aperture stop S is preferably arranged near the third lens group G3 (near the third-a partial lens group G3a when the third lens group G3 is constituted by the third-a partial lens group G3a and third-b partial lens group G3b), a lens frame may act therefor without providing any member as the aperture stop.

When an antireflection coating exhibiting high transmittance over a broad wavelength range is applied to each lens surface, flares and ghosts can be reduced, so as to achieve high optical performances with a high contrast.

The present invention is explained with reference to constituent features of its embodiments for easier understanding, but is not limited thereto as a matter of course.

EXAMPLES

Figure 1:
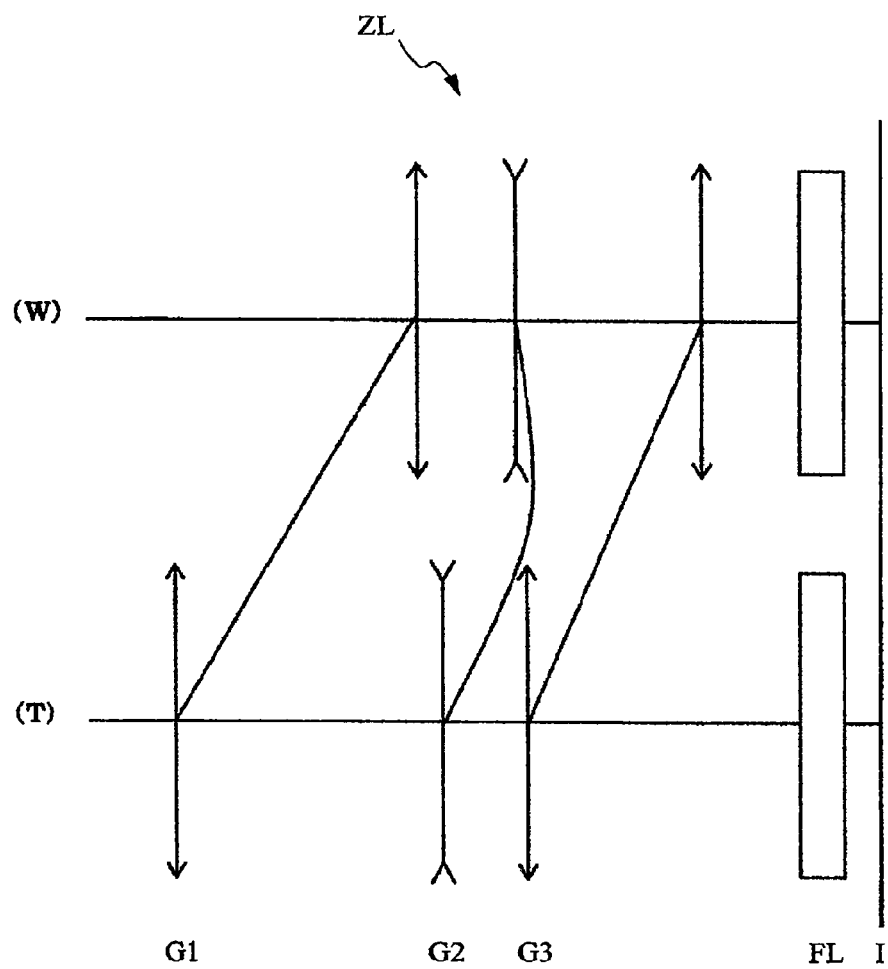
FIG. 1 shows a refractive power arrangement of the zoom lens system in accordance with an embodiment of the present invention.

Examples of the present invention will now be explained with reference to the accompanying drawings. FIG. 1 shows the refractive power distribution of the zoom lens system ZL in accordance with the examples and how its lens groups move upon zooming from the wide-angle end state (W) to the telephoto end state (T). As shown in FIG. 1, the zoom lens system ZL in accordance with the examples is composed, in order from the object, of the first lens group G1 having a positive refractive power, the second lens group G2 having a negative refractive power, and the third lens group G3 having a positive refractive power, and a filter group FL comprising a low-pass filter, an infrared cut filter, and the like. Upon zooming from the wide-angle end state to the telephoto end state, at least the first lens group G1 and third lens group G3 move toward the object. The examples are constructed such that, upon zooming from the wide-angle end state to the telephoto end state, the distance between the first lens group G1 and second lens group G2 increases while the distance between the second lens group G2 and third lens group G3 decreases.

In Example 4, the aspherical surface is represented by the following expression (a):

$$S(y) = (y^2/r)/[1 + (1 - \kappa \times y^2/r^2)^{1/2}] + A4 \times y^4 + A6 \times y^6 + A8 \times y^8 + A10 \times y^{10} \qquad (a)$$

where y denotes the height perpendicular to the optical axis, S(y) denotes the distance (sag amount) along the optical axis from the tangent plane at the vertex of the aspherical surface to the aspherical surface at the height y, r denotes the radius of curvature of a reference spherical surface (radius of paraxial curvature), $\kappa$ denotes the conical constant, and An denotes the nth-order aspherical coefficient. "E-n" (where n is an integer) denotes "$\times 10^{-n}$" in Example 4 which will be set forth later.

In Example 4, the second-order aspherical surface coefficient A2 is 0. In the table for Example 4, "*" is added to the left side of the surface number representing the aspherical surface.

Example 1

FIG. 2 is a view showing the structure of the zoom lens system ZL1 in accordance with Example 1 of the present invention. In the zoom lens system ZL1 of FIG. 2, the first lens group G1 is composed, in order from the object, of a first-a partial lens group G1a and a first-b partial lens group G1b; the first-a partial lens group G1a is made of a cemented positive lens constructed by cementing a negative meniscus lens L11 having a convex surface facing the object and a double convex lens L12 together; and the first-b partial lens group G1b is constituted by a double convex lens L13. The second lens group G2 is composed, in order from the object, of a double concave lens L21, a cemented negative lens constructed by cementing a double concave lens L22 and a double convex lens L23 together, and a double concave lens L24. The third lens group G3 is composed, in order from the object, of a third-a partial lens group G3a and a third-b partial lens group G3b; the third-a partial lens group G3a is composed of a double convex lens L31, a cemented negative lens constructed by cementing a double convex lens L32 and a double concave lens L33 together, and a double convex lens L34; and the third-b partial lens group G3b is composed of a cemented negative lens constructed by cementing a double concave lens L35 and a double convex lens L36 together and a negative meniscus lens L37 having a concave surface facing the object. Further, a filter group FL is constructed by a low-pass filter, an infrared cut filter, and the like.

An image surface I is formed on an imaging device which is not depicted, while the imaging device is constituted by CCD, CMOS, and the like (as in examples which will follow). An aperture stop S is arranged closest to the object in the third lens group G3, and moves together with the third lens group G3 at the time of zooming from the wide-angle end state to the telephoto end state.

The following Table 1 lists values of data in Example 1. In Table 1, f, F.NO, 2ω, and Bf denote the focal length, f-number, angle of view, and back focus, respectively. The surface number indicates the lens surface number counted in order from the object along the advancing direction of light beams, while the refractive index and Abbe number refer to their values at d-line ($\lambda$=587.6 nm). While "mm" is generally used for the unit of lengths such as focal length f, radius of curvature r, and surface distance d listed in all of the following data values, the unit is not limited thereto, since optical systems can attain similar optical performances even after being proportionally enlarged or reduced. The radius of curvature of 0.0000 indicates a plane, while the refractive index of air, which is 1.00000, is omitted. These explanations of symbols and data tables also apply to examples which will follow. In the following tables, W, IFL, T, IH, and TLL denote the Wide-angle end, Intermediate focal length, Telephoto end, Image height, and Total lens length, respectively. Also, s, r, d, n, and ν denote the Surface No., Radius of curvature, Surface distance, Refractive index, and Abbe number, respectively, in the following tables.

TABLE 1

| | W | | IF | | T |
|---|---|---|---|---|---|
| f = | 30.00 | ~ | 65.50 | ~ | 107.09 |
| F.NO = | 4.14 | ~ | 4.85 | ~ | 5.75 |
| 2ω = | 31.89 | ~ | 14.24 | ~ | 8.79 |
| IH = | 8.50 | ~ | 8.50 | ~ | 8.50 |
| TLL = | 76.00 | ~ | 95.28 | ~ | 105.00 |

| s | r | d | n | ν |
|---|---|---|---|---|
| 1 | 280.8182 | 0.95 | 1.83400 | 37.16 |
| 2 | 51.9013 | 3.00 | 1.49782 | 82.52 |
| 3 | 69.7458 | 4.20 | | |
| 4 | 39.2708 | 2.35 | 1.49782 | 82.52 |
| 5 | −1873.4179 | (d5) | | |
| 6 | −150.2667 | 0.80 | 1.69680 | 55.53 |
| 7 | 30.0997 | 0.85 | | |
| 8 | −29.0467 | 0.80 | 1.69680 | 55.53 |
| 9 | 18.3923 | 2.20 | 1.84666 | 23.78 |
| 10 | −166.9992 | 1.00 | | |
| 11 | −20.5558 | 0.80 | 1.72916 | 54.68 |
| 12 | 4007.8031 | (d12) | | |

TABLE 1-continued

| | | | | |
|---|---|---|---|---|
| 13 | 0.0000 | 0.50 | | (aperture stop S) |
| 14 | 75.9842 | 2.15 | 1.60311 | 60.64 |
| 15 | −23.7528 | 0.10 | | |
| 16 | 20.7865 | 3.30 | 1.49782 | 82.52 |
| 17 | −15.5285 | 0.80 | 1.80384 | 33.89 |
| 18 | 77.1180 | 0.10 | | |
| 19 | 13.9597 | 2.70 | 1.60300 | 65.44 |
| 20 | −83.0727 | 8.55 | | |
| 21 | −29.0384 | 0.80 | 1.74400 | 44.79 |
| 22 | 6.7551 | 3.75 | 1.61293 | 37.00 |
| 23 | −16.0409 | 0.85 | | |
| 24 | −8.2498 | 1.15 | 1.78800 | 47.37 |
| 25 | −13.8878 | (d25) | | |
| 26 | 0.0000 | 1.00 | 1.51680 | 64.12 |
| 27 | 0.0000 | 1.50 | | |
| 28 | 0.0000 | 1.87 | 1.51680 | 64.12 |
| 29 | 0.0000 | 0.40 | | |
| 30 | 0.0000 | 0.70 | 1.51680 | 64.12 |
| 31 | 0.0000 | (Bf) | | |

Focal length of lens group

| Group | Initial surface | Focal length |
|---|---|---|
| 1 | 1 | 60.6470 |
| 2 | 6 | −12.6602 |
| 3 | 14 | 14.7906 |

In Example 1, the axial air space d5 between the first and second lens groups G1, G2, the axial air space d12 between the second and third lens groups G2, G3, the axial air space d25 between the third lens group G3 and filter group FL, and the back focus Bf vary during zooming. The following Table 2 lists variable spaces at infinity at respective focal lengths in the wide-angle end, intermediate focal length, and telephoto end states.

TABLE 2

| | W | IF | T |
|---|---|---|---|
| f | 30.0001 | 65.5002 | 107.0904 |
| d5 | 1.9728 | 19.9502 | 25.5252 |
| d12 | 9.7735 | 5.1106 | 1.6047 |
| d25 | 16.6581 | 22.6196 | 30.2744 |
| Bf | 0.5000 | 0.5001 | 0.5002 |

The following Table 3 lists values corresponding to the conditional expressions in Example 1.

TABLE 3 fw = 30.0001
f1 = 60.6470
f1a = 271.7971
f1b = 77.2975
f2 = −12.6602
f3 = 14.7906
(1) f1b/f1a = 0.2844
(2) f1/fw = 2.0216
(3) f1b/f1 = 1.2745
(3) f1/(−f2) = 4.7904
(3) f1/f3 = 4.1004

Figure 3A:
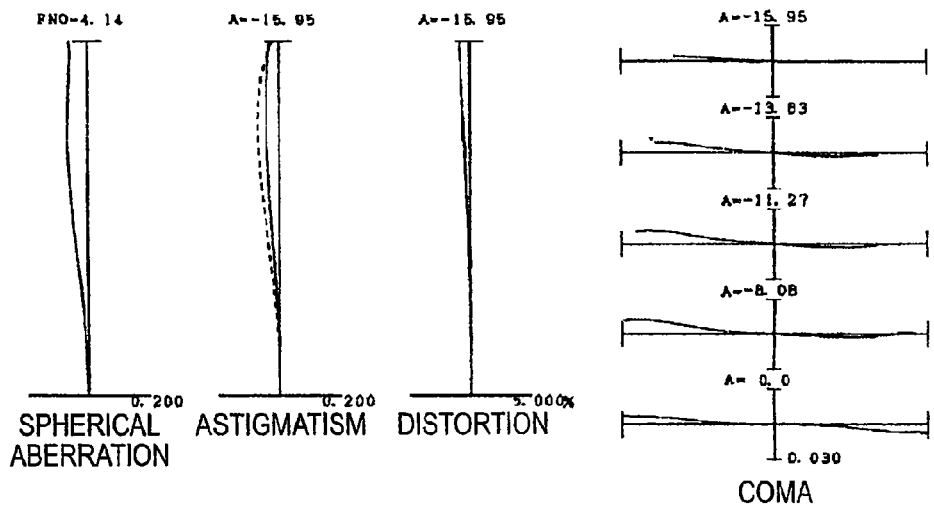
FIG. 3A is an aberration chart in Example 1 in a wide-angle end state upon focusing at infinity.
Figure 3B:
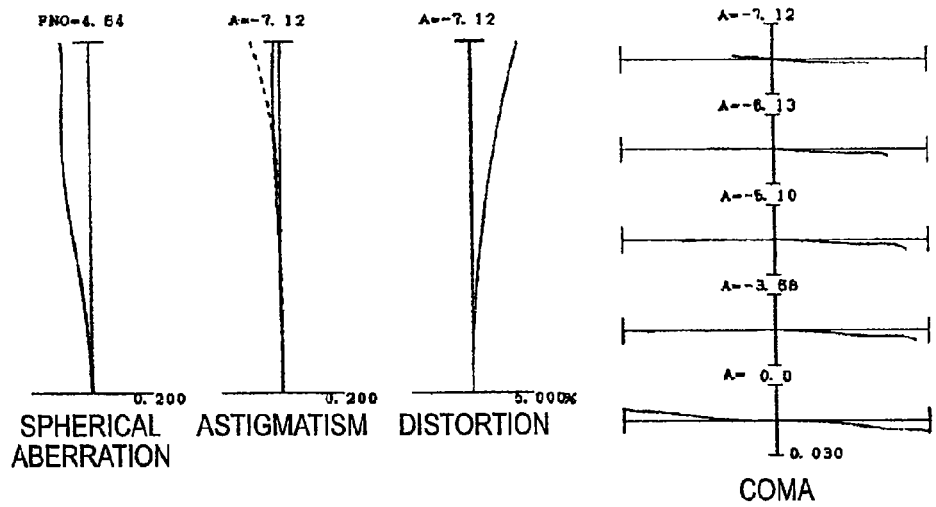
FIG. 3B is an aberration chart in Example 1 in an intermediate focal length state upon focusing at infinity.
Figure 3C:
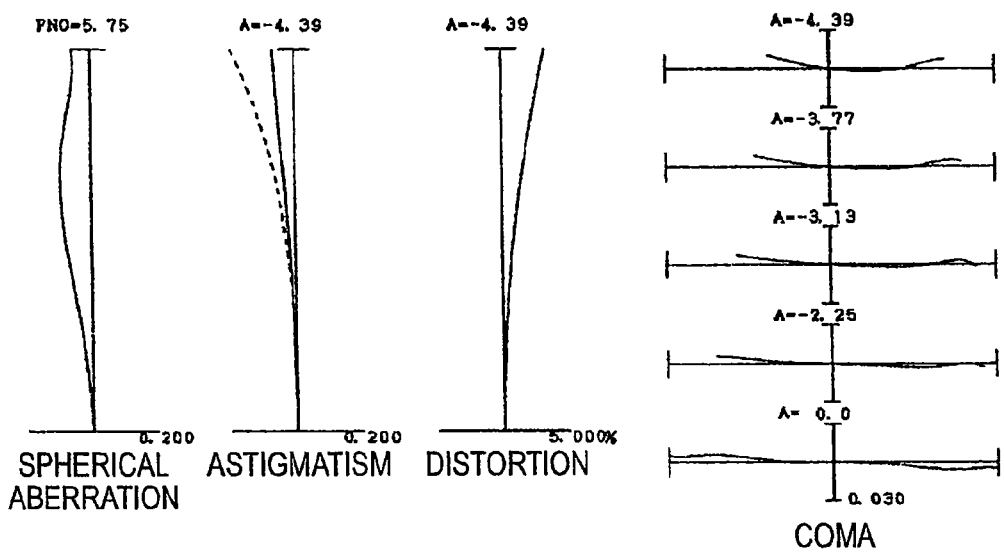
FIG. 3C is an aberration chart in Example 1 in a telephoto end state upon focusing at infinity.

FIGS. 3A to 3C are aberration charts showing various aberrations of Example 1 at d-line (λ=587.6 nm). FIG. 3A is an aberration chart upon focusing at infinity in the wide-angle end state (f=30.00 mm) FIG. 3B is an aberration chart upon focusing at infinity in the intermediate focal length state (f=65.50 mm). FIG. 3C is an aberration chart upon focusing at infinity in the telephoto end state (f=107.09 mm).

In each aberration chart, FNO and A denote the f-number and the half angle of view at each image height, respectively. In each astigmatism chart, solid and broken lines indicate sagittal and meridional image surfaces, respectively. The same symbols as those of this example will be used in various aberration charts of the following examples. The aberration charts indicate that various aberrations are favorably corrected in each focal length state from the wide-angle end state to the telephoto end state, whereby Example 1 has excellent imaging performances.

Example 2

Figure 4:
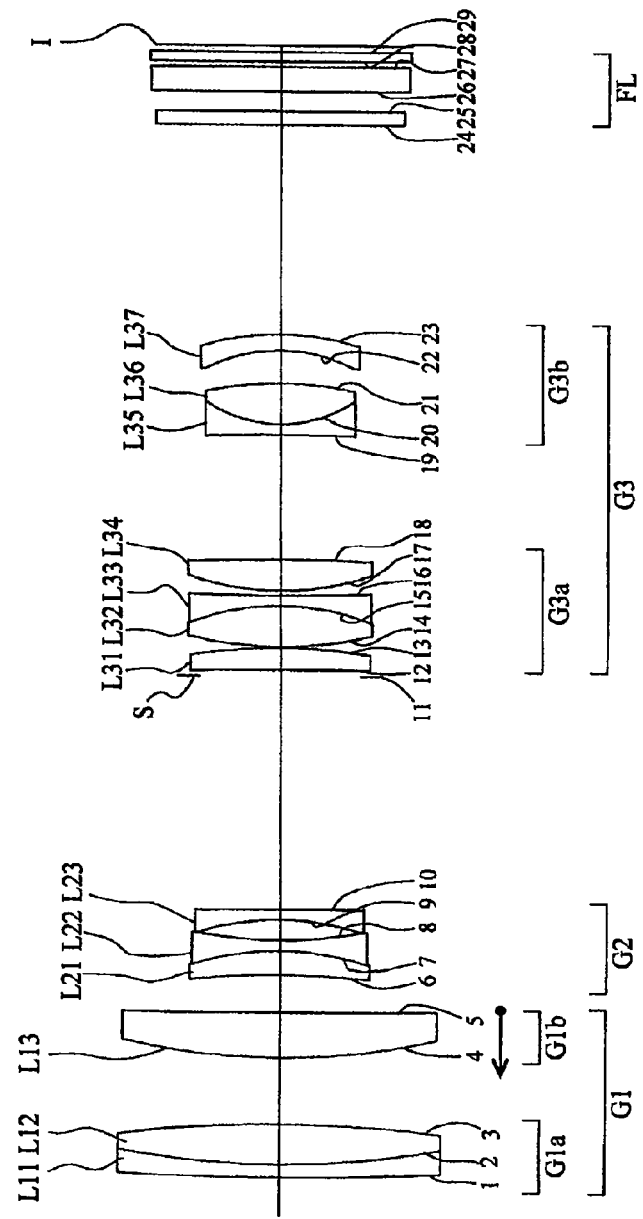
FIG. 4 is a sectional view showing the structure of the zoom lens system in accordance with Example 2.

FIG. 4 is a view showing the structure of the zoom lens system ZL2 in accordance with Example 2 of the present invention. In the zoom lens system ZL2 of FIG. 4, the first lens group G1 is composed, in order from the object, of a first-a partial lens group G1a and a first-b partial lens group G1b; the first-a partial lens group G1a is made of a cemented positive lens constructed by cementing a negative meniscus lens L11 having a convex surface facing the object and a double convex lens L12 together; and the first-b partial lens group G1b is constituted by a positive meniscus lens L13 having a convex surface facing the object. The second lens group G2 is composed, in order from the object, of a cemented negative lens constructed by cementing a positive meniscus lens L21 having a concave surface facing the object and a double concave lens L22 together and a negative meniscus lens L23 having a concave surface facing the object. The third lens group G3 is composed, in order from the object, of a third-a partial lens group G3a and a third-b partial lens group G3b; the third-a partial lens group G3a is composed of a positive meniscus lens L31 having a concave surface facing the object, a cemented positive lens constructed by cementing a double convex lens L32 and a double concave lens L33 together, and a double convex lens L34; and the third-b partial lens group G3b is composed of a cemented negative lens constructed by cementing a double concave lens L35 and a double convex lens L36 together and a negative meniscus lens L37 having a concave surface facing the object. Further, a filter group FL is constructed by a low-pass filter, an infrared cut filter, and the like. An aperture stop S is arranged closest to the object in the third lens group G3, and moves together with the third lens group G3 at the time of zooming from the wide-angle end state to the telephoto end state.

The following Table 4 lists values of data in Example 2.

TABLE 4

| | W | | IF | | T |
|---|---|---|---|---|---|
| f = | 30.00 | ~ | 71.50 | ~ | 107.09 |
| F.NO = | 4.21 | ~ | 5.04 | ~ | 5.68 |
| 2ω = | 31.94 | ~ | 13.08 | ~ | 8.80 |
| IH = | 8.50 | ~ | 8.50 | ~ | 8.50 |
| TLL = | 85.00 | ~ | 100.37 | ~ | 105.00 |

| s | r | d | n | ν |
|---|---|---|---|---|
| 1 | 240.0450 | 0.95 | 1.83400 | 37.16 |
| 2 | 57.2707 | 3.00 | 1.49782 | 82.52 |
| 3 | −78.0810 | 4.96 | | |
| 4 | 45.8457 | 3.39 | 1.49782 | 82.52 |
| 5 | 2463.4485 | (d5) | | |
| 6 | −51.4985 | 1.78 | 1.84666 | 23.78 |
| 7 | −17.8534 | 0.80 | 1.56384 | 60.66 |
| 8 | 28.7811 | 1.50 | | |
| 9 | −16.9251 | 0.80 | 1.62041 | 60.29 |
| 10 | −301.4407 | (d10) | | |
| 11 | 0.0000 | 0.50 | | (aperture stop S) |
| 12 | −401.0383 | 1.66 | 1.49700 | 81.54 |
| 13 | −35.3632 | 0.10 | | |

TABLE 4-continued

| | | | | |
|---|---|---|---|---|
| 14 | 25.0498 | 3.08 | 1.60300 | 65.44 |
| 15 | -15.7224 | 0.80 | 1.80384 | 33.89 |
| 16 | 203.8341 | 0.33 | | |
| 17 | 17.4417 | 2.36 | 1.61800 | 63.33 |
| 18 | -126.1678 | 9.45 | | |
| 19 | -130.2123 | 0.80 | 1.83481 | 42.71 |
| 20 | 8.3229 | 3.10 | 1.62004 | 36.26 |
| 21 | -21.3280 | 2.50 | | |
| 22 | -10.0516 | 1.20 | 1.78800 | 47.37 |
| 23 | -17.1063 | (d23) | | |
| 24 | 0.0000 | 1.00 | 1.51680 | 64.12 |
| 25 | 0.0000 | 1.50 | | |
| 26 | 0.0000 | 1.87 | 1.51680 | 64.12 |
| 27 | 0.0000 | 0.40 | | |
| 28 | 0.0000 | 0.70 | 1.51680 | 64.12 |
| 29 | 0.0000 | (Bf) | | |

Focal length of lens group

| Group | Initial surface | Focal length |
|---|---|---|
| 1 | 1 | 69.0008 |
| 2 | 6 | -17.7314 |
| 3 | 12 | 19.4587 |

In Example 2, the axial air space d5 between the first and second lens groups G1, G2, the axial air space d10 between the second and third lens groups G2, G3, the axial air space d23 between the third lens group G3 and filter group FL, and the back focus Bf vary during zooming. The following Table 5 lists variable spaces at infinity at respective focal lengths in the wide-angle end, intermediate focal length, and telephoto end states.

TABLE 5

| | W | IF | T |
|---|---|---|---|
| f | 30.0000 | 71.4999 | 107.0900 |
| d5 | 2.8000 | 21.7359 | 26.5682 |
| d10 | 17.4541 | 7.0722 | 1.5000 |
| d23 | 15.7213 | 22.5407 | 27.9069 |
| Bf | 0.4999 | 0.5001 | 0.5002 |

The following Table 6 lists values corresponding to the conditional expressions in Example 2.

TABLE 6 fw = 30.0000
f1 = 69.0008
f1a = 249.4035
f1b = 93.7955
f2 = -17.7314
f3 = 19.4587
(1)f1b/f1a = 0.3761
(2)f1/fw = 2.3000
(3)f1b/f1 = 1.3593
(4)f1/(-f2) = 3.8915
(5)f1/f3 = 3.5460

Figure 5A:
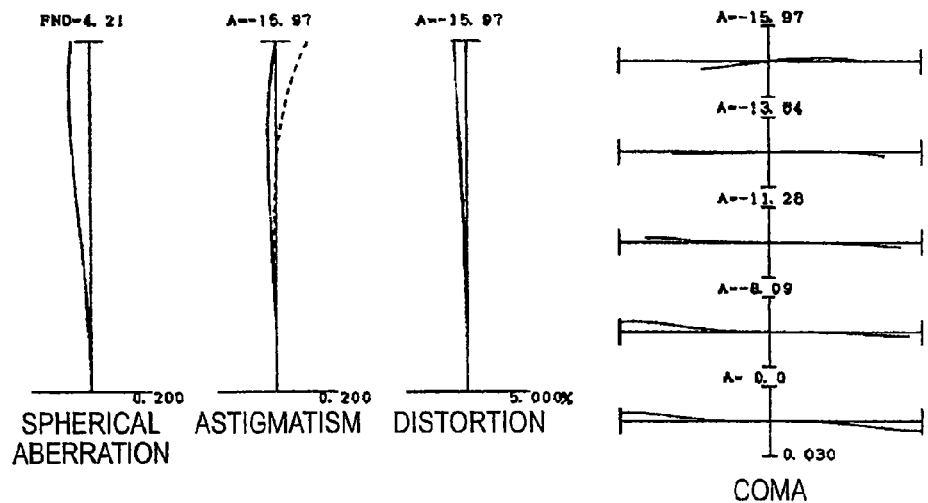
FIG. 5A is an aberration chart in Example 2 in the wide-angle end state upon focusing at infinity.
Figure 5B:
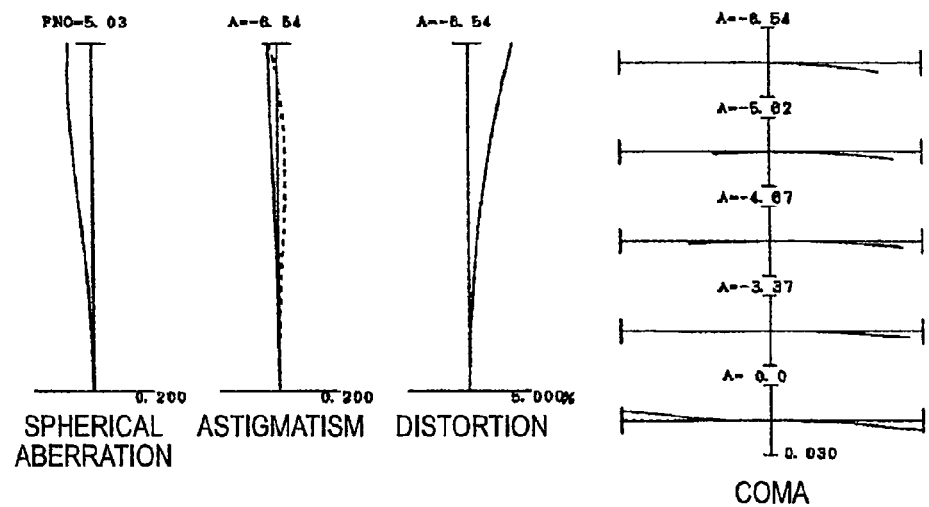
FIG. 5B is an aberration chart in Example 2 in the intermediate focal length state upon focusing at infinity.

FIGS. 5A to 5C are aberration charts showing various aberrations of Example 2 at d-line ($\lambda$=587.6 nm). FIG. 5A is an aberration chart upon focusing at infinity in the wide-angle end state (f=30.00 mm) FIG. 5B is an aberration chart upon focusing at infinity in the intermediate focal length state (f=71.50 mm). FIG. 5C is an aberration chart upon focusing at infinity in the telephoto end state (f=107.09 mm) The aberration charts indicate that various aberrations are favorably corrected in each focal length state from the wide-angle end state to the telephoto end state, whereby Example 2 has excellent imaging performances.

Example 3

Figure 6:
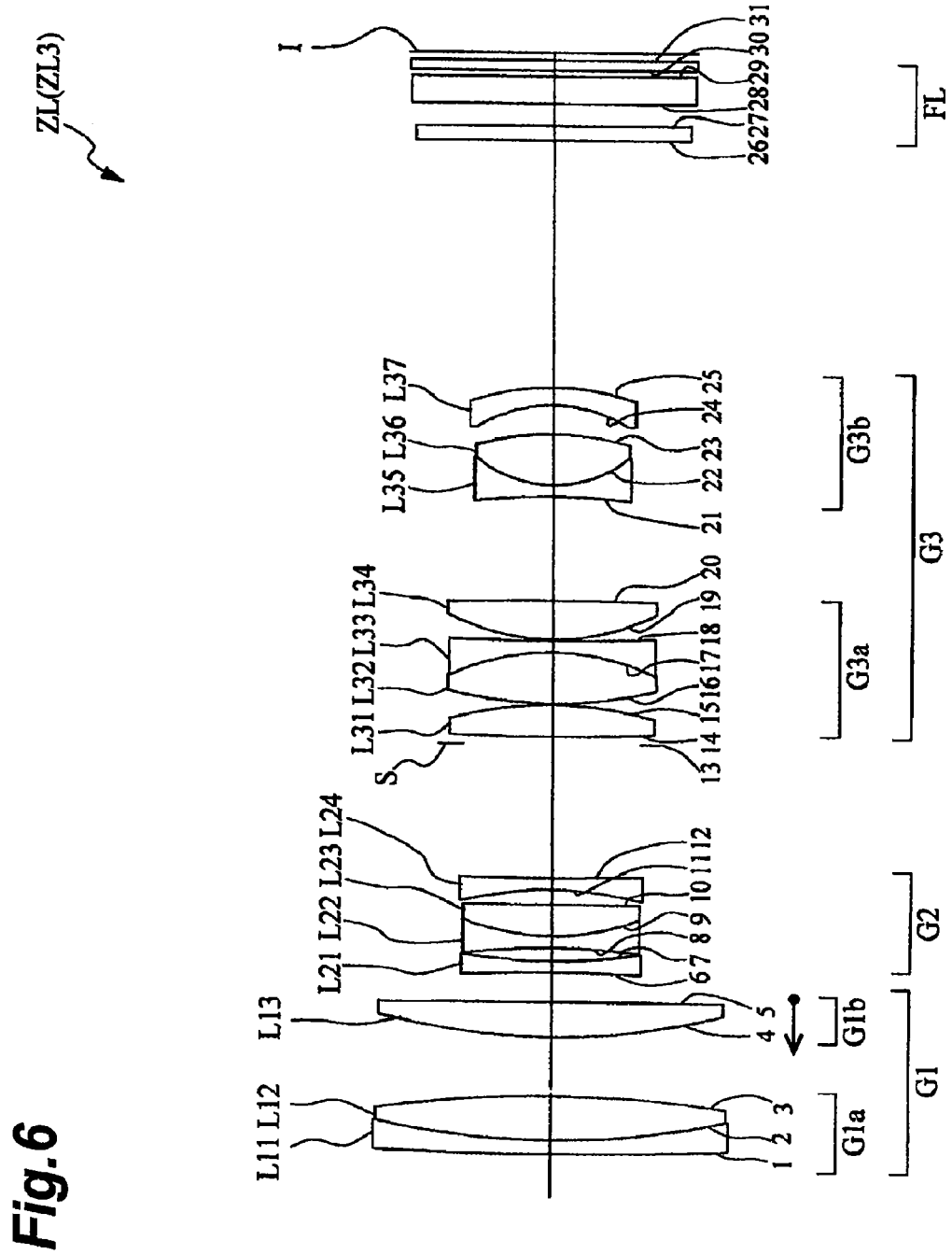
FIG. 6 is a sectional view showing the structure of the zoom lens system in accordance with Example 3.

FIG. 6 is a view showing the structure of the zoom lens system ZL3 in accordance with Example 3 of the present invention. In the zoom lens system ZL3 of FIG. 6, the first lens group G1 is composed, in order from the object, of a first-a partial lens group G1a and a first-b partial lens group G1b; the first-a partial lens group G1a is made of a cemented positive lens constructed by cementing a negative meniscus lens L11 having a convex surface facing the object and a double convex lens L12 together; and the first-b partial lens group G1b is constituted by a double convex lens L13. The second lens group G2 is composed, in order from the object, of a double concave lens L21, a cemented negative lens constructed by cementing a double concave lens L22 and a double convex lens L23 together, and a double concave lens L24. The third lens group G3 is composed, in order from the object, of a third-a partial lens group G3a and a third-b partial lens group G3b; the third-a partial lens group G3a is composed of a double convex lens L31, a cemented positive lens constructed by cementing a double convex lens L32 and a double concave lens L33 together, and a double convex lens L34; and the third-b partial lens group G3b is composed of a cemented negative lens constructed by cementing a double concave lens L35 and a double convex lens L36 together and a negative meniscus lens L37 having a concave surface facing the object. Further, a filter group FL is constructed by a low-pass filter, an infrared cut filter, and the like. An aperture stop S is arranged closest to the object in the third lens group G3, and moves together with the third lens group G3 at the time of zooming from the wide-angle end state to the telephoto end state.

The following Table 7 lists values of data in Example 3.

TABLE 7

| | W | | IF | | T |
|---|---|---|---|---|---|
| f = | 29.54 | ~ | 65.50 | ~ | 107.09 |
| F. NO = | 4.11 | ~ | 4.87 | ~ | 5.77 |
| 2ω = | 32.41 | ~ | 14.23 | ~ | 8.79 |
| IH = | 8.50 | ~ | 8.50 | ~ | 8.50 |
| TLL = | 75.50 | ~ | 95.08 | ~ | 105.00 |

| s | r | d | n | ν |
|---|---|---|---|---|
| 1 | 234.2875 | 0.95 | 1.83400 | 37.16 |
| 2 | 47.9733 | 3.00 | 1.49782 | 82.52 |
| 3 | -67.6099 | 3.99 | | |
| 4 | 39.4608 | 2.40 | 1.49782 | 82.52 |
| 5 | -1268.7397 | (d5) | | |
| 6 | -118.4337 | 0.80 | 1.75500 | 52.32 |
| 7 | 35.2574 | 0.90 | | |
| 8 | -38.6035 | 0.80 | 1.72000 | 50.23 |
| 9 | 14.0729 | 2.15 | 1.84666 | 23.78 |
| 10 | -1793.3532 | 1.00 | | |
| 11 | -19.9098 | 0.80 | 1.75500 | 52.32 |
| 12 | 287.2798 | (d12) | | |
| 13 | 0.0000 | 0.50 | | (aperture stop S) |
| 14 | 130.0681 | 2.20 | 1.49782 | 82.52 |
| 15 | -21.0703 | 0.10 | | |
| 16 | 25.0108 | 3.50 | 1.60300 | 65.44 |
| 17 | -13.7558 | 0.80 | 1.80384 | 33.89 |
| 18 | 144.9113 | 0.10 | | |
| 19 | 13.1441 | 2.70 | 1.61800 | 63.33 |
| 20 | -300.7928 | 7.20 | | |
| 21 | -38.5116 | 0.80 | 1.80610 | 40.92 |
| 22 | 7.0874 | 3.50 | 1.62004 | 36.26 |
| 23 | -15.7257 | 2.00 | | |
| 24 | -8.3980 | 1.20 | 1.75500 | 52.32 |
| 25 | -14.8336 | (d25) | | |
| 26 | 0.0000 | 1.00 | 1.51680 | 64.12 |
| 27 | 0.0000 | 1.50 | | |
| 28 | 0.0000 | 1.87 | 1.51680 | 64.12 |
| 29 | 0.0000 | 0.40 | | |

TABLE 7-continued

| | | | | |
|---|---|---|---|---|
| 30 | 0.0000 | 0.70 | 1.51680 | 64.12 |
| 31 | 0.0000 | (Bf) | | |

Focal length of lens group

| Group | Initial surface | Focal length |
|---|---|---|
| 1 | 1 | 59.4437 |
| 2 | 6 | −12.0481 |
| 3 | 14 | 14.3179 |

In Example 3, the axial air space d5 between the first and second lens groups G1, G2, the axial air space d12 between the second and third lens groups G2, G3, the axial air space d25 between the third lens group G3 and filter group FL, and the back focus Bf vary during zooming. The following Table 8 lists variable spaces at infinity at respective focal lengths in the wide-angle end, intermediate focal length, and telephoto end states.

TABLE 8

| | W | IF | T |
|---|---|---|---|
| f | 29.5364 | 65.4997 | 107.0894 |
| d5 | 2.0000 | 19.6062 | 25.1011 |
| d12 | 9.1910 | 4.7496 | 1.5000 |
| d25 | 16.9515 | 23.3655 | 31.0414 |
| Bf | 0.4999 | 0.4999 | 0.4998 |

The following Table 9 lists values corresponding to the conditional expressions in Example 3.

TABLE 9

| |
|---|
| fw = 29.5364 |
| f1 = 59.4437 |
| f1a = 252.1944 |
| f1b = 76.9230 |
| f2 = −12.0481 |
| f3 = 14.3179 |
| (1)f1b/f1a = 0.3050 |
| (2)f1/fw = 2.0126 |
| (3)f1b/f1 = 1.2940 |
| (3)f1/(−f2) = 4.9339 |
| (3)f1/f3 = 4.1517 |

Figure 7A:
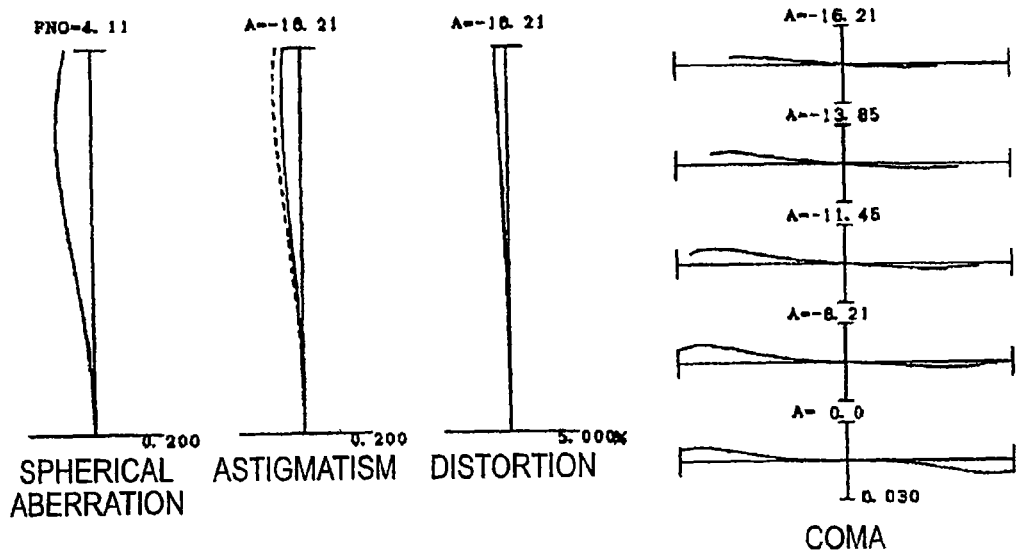
FIG. 7A is an aberration chart in Example 3 in the wide-angle end state upon focusing at infinity.
Figure 7B:
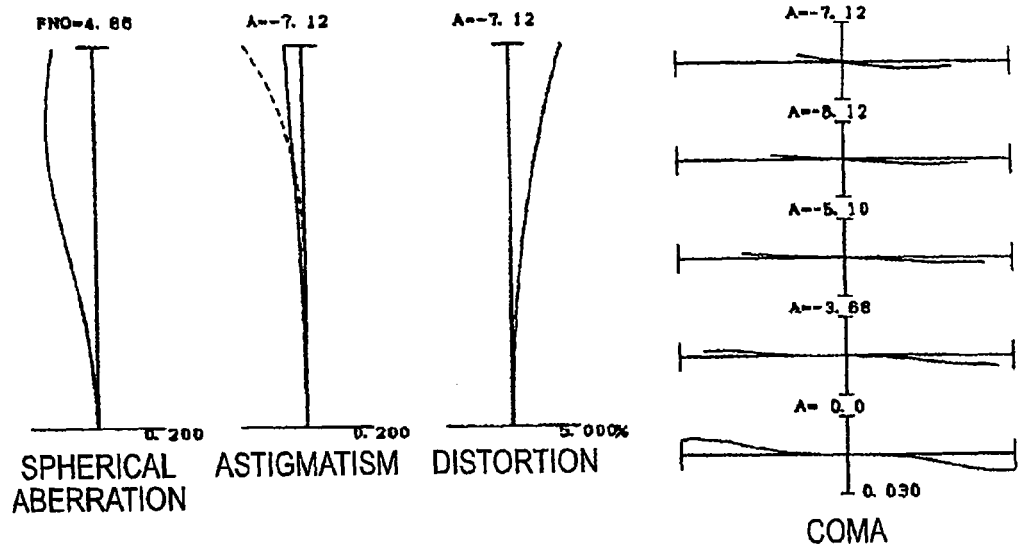
FIG. 7B is an aberration chart in Example 3 in the intermediate focal length state upon focusing at infinity.

FIGS. 7A to 7C are aberration charts showing various aberrations of Example 3 at d-line (λ=587.6 nm). FIG. 7A is an aberration chart upon focusing at infinity in the wide-angle end state (f=29.54 mm). FIG. 7B is an aberration chart upon focusing at infinity in the intermediate focal length state (f=65.50 mm). FIG. 7C is an aberration chart upon focusing at infinity in the telephoto end state (f=107.09 mm). The aberration charts indicate that various aberrations are favorably corrected in each focal length state from the wide-angle end state to the telephoto end state, whereby Example 3 has excellent imaging performances.

Example 4

Figure 8:
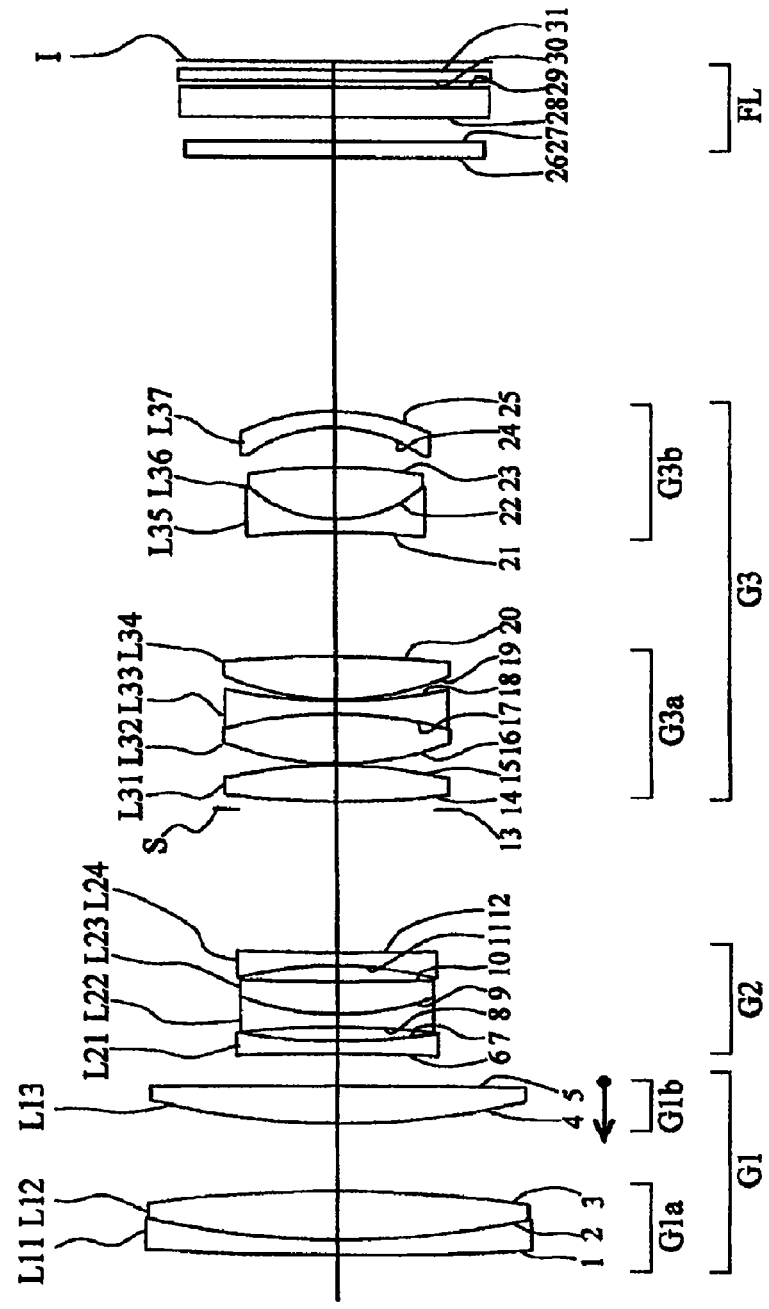
FIG. 8 is a sectional view showing the structure of the zoom lens system in accordance with Example 4.

FIG. 8 is a view showing the structure of the zoom lens system ZL4 in accordance with Example 4 of the present invention. In the zoom lens system ZL4 of FIG. 8, the first lens group G1 is composed, in order from the object, of a first-a partial lens group G1a and a first-b partial lens group G1b; the first-a partial lens group G1a is made of a cemented positive lens constructed by cementing a negative meniscus lens L11 having a convex surface facing the object and a double convex lens L12 together; and the first-b partial lens group G1b is constituted by a double convex lens L13. The second lens group G2 is composed, in order from the object, of a double concave lens L21, a cemented negative lens constructed by cementing a double concave lens L22 and a negative meniscus lens L23 having a concave surface facing the image together, and a double concave lens L24. The third lens group G3 is composed, in order from the object, of a third-a partial lens group G3a and a third-b partial lens group G3b; the third-a partial lens group G3a is composed of a double convex lens L31, a cemented positive lens constructed by cementing a double convex lens L32 and a double concave lens L33 together, and a double convex lens L34; and the third-b partial lens group G3b is composed of a cemented negative lens constructed by cementing a double concave lens L35 and a double convex lens L36 together and a negative meniscus lens L37 having a concave surface facing the object. Further, a filter group FL is constructed by a low-pass filter, an infrared cut filter, and the like. An aperture stop S is arranged closest to the object in the third lens group G3, and moves together with the third lens group G3 at the time of zooming from the wide-angle end state to the telephoto end state.

The following Table 10 lists values of data in Example 4.

TABLE 10

| | W | | IF | | T |
|---|---|---|---|---|---|
| f = | 30.00 | ~ | 65.50 | ~ | 107.09 |
| F. NO = | 4.10 | ~ | 4.80 | ~ | 5.66 |
| 2ω = | 31.94 | ~ | 14.24 | ~ | 8.79 |
| IH = | 8.50 | ~ | 8.50 | ~ | 8.50 |
| TLL = | 74.85 | ~ | 94.77 | ~ | 104.64 |

| s | r | d | n | ν |
|---|---|---|---|---|
| 1 | 193.2233 | 0.95 | 1.83400 | 37.16 |
| 2 | 47.3650 | 3.00 | 1.49782 | 82.52 |
| 3 | −75.6262 | 4.20 | | |
| 4 | 42.0254 | 2.37 | 1.49782 | 82.52 |
| 5 | −578.3692 | (d5) | | |
| 6 | −94.6162 | 0.80 | 1.69680 | 55.53 |
| 7 | 34.4303 | 0.87 | | |
| 8 | −43.1620 | 0.80 | 1.69680 | 55.53 |
| 9 | 14.6962 | 2.05 | 1.84666 | 23.78 |
| 10 | 184.3492 | 1.00 | | |
| 11 | −20.2434 | 0.80 | 1.72916 | 54.68 |
| 12 | 278.2271 | (d12) | | |
| 13 | 0.0000 | 0.50 | | (aperture stop S) |
| *14 | 45.2942 | 2.31 | 1.59201 | 67.02 |
| 15 | −24.2906 | 0.10 | | |
| 16 | 16.7868 | 3.15 | 1.49700 | 81.54 |
| 17 | −21.5682 | 0.80 | 1.80384 | 33.89 |
| 18 | 29.0872 | 0.10 | | |
| 19 | 14.9282 | 2.70 | 1.61800 | 63.33 |
| 20 | −59.7605 | 7.84 | | |
| 21 | −51.0971 | 0.80 | 1.74400 | 44.79 |
| 22 | 7.1372 | 3.29 | 1.61293 | 37.00 |
| 23 | −26.5759 | 2.50 | | |
| 24 | −8.0713 | 1.01 | 1.75500 | 52.32 |
| 25 | −11.6918 | (d25) | | |
| 26 | 0.0000 | 1.00 | 1.51680 | 64.12 |
| 27 | 0.0000 | 1.50 | | |
| 28 | 0.0000 | 1.87 | 1.51680 | 64.12 |
| 29 | 0.0000 | 0.40 | | |
| 30 | 0.0000 | 0.70 | 1.51680 | 64.12 |
| 31 | 0.0000 | (Bf) | | |

Focal length of lens group

| Group | Initial surface | Focal length |
|---|---|---|
| 1 | 1 | 61.1194 |
| 2 | 6 | −12.1826 |
| 3 | 14 | 14.2210 |

In Example 4, the surface No. 14 is formed aspherical. The following Table 11 shows data of the aspherical surface, i.e., values of the apical radius of curvature R, conical constant κ, and aspheric constants A4 to A10.

TABLE 11

[Surface No. 14]

| R | κ | A4 | A6 | A8 | A10 |
|---|---|---|---|---|---|
| 45.2942 | −6.9268 | −1.1290E−5 | −7.6188E−8 | +1.4298E−9 | −1.7925E−11 |

In Example 4, the axial air space d5 between the first and second lens groups G1, G2, the axial air space d12 between the second and third lens groups G2, G3, the axial air space d25 between the third lens group G3 and filter group FL, and the back focus Bf vary during zooming. The following Table 12 lists variable spaces at infinity at respective focal lengths in the wide-angle end, intermediate focal length, and telephoto end states.

TABLE 12

|  | W | IF | T |
|---|---|---|---|
| f | 30.0000 | 65.4998 | 107.0895 |
| d5 | 2.0000 | 20.2978 | 26.0910 |
| d12 | 9.0187 | 4.7480 | 1.5000 |
| d25 | 15.9456 | 21.8209 | 29.1420 |
| Bf | 0.4912 | 0.5021 | 0.5108 |

The following Table 13 lists values corresponding to the conditional expressions in Example 4.

TABLE 13

| fw = 30.0001 |
| f1 = 61.1194 |
| f1a = 260.4946 |
| f1b = 78.8004 |
| f2 = −12.1826 |
| f3 = 14.2210 |
| (1)f1b/f1a = 0.3025 |
| (2)f1/fw = 2.0373 |
| (3)f1b/f1 = 1.2893 |
| (4)f1/(−f2) = 5.0169 |
| (5)f1/f3 = 4.2978 |

Figure 9A:
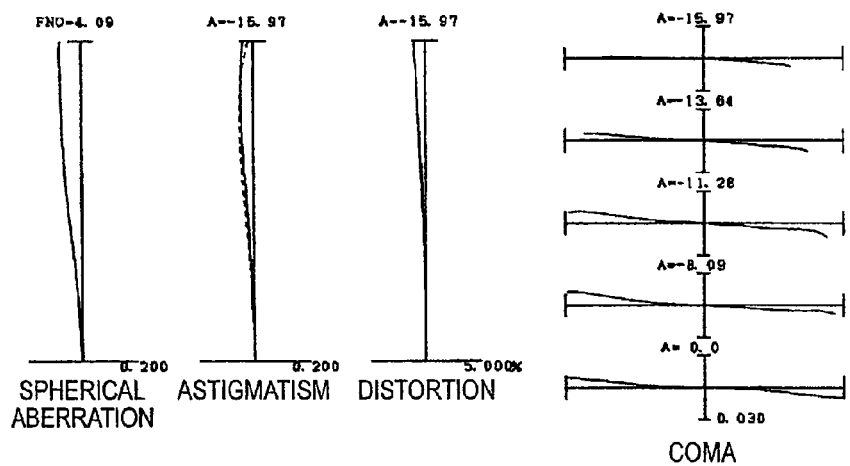
FIG. 9A is an aberration chart in Example 4 in the wide-angle end state upon focusing at infinity.
Figure 9B:
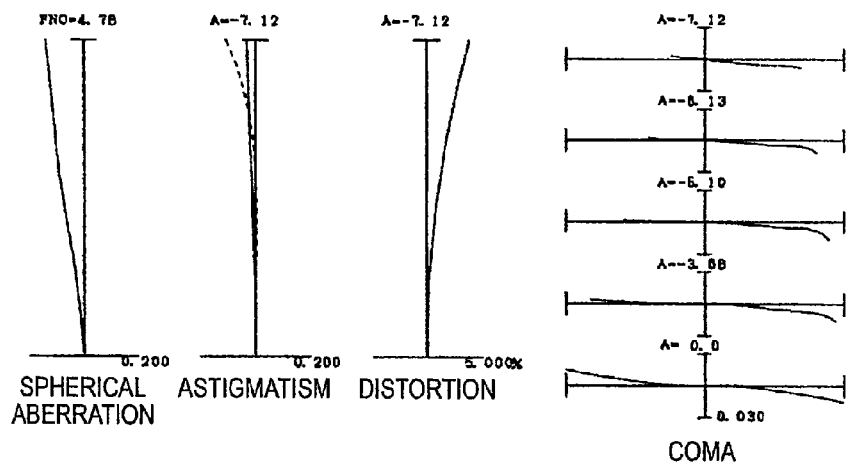
FIG. 9B is an aberration chart in Example 4 in the intermediate focal length state upon focusing at infinity.
Figure 9C:
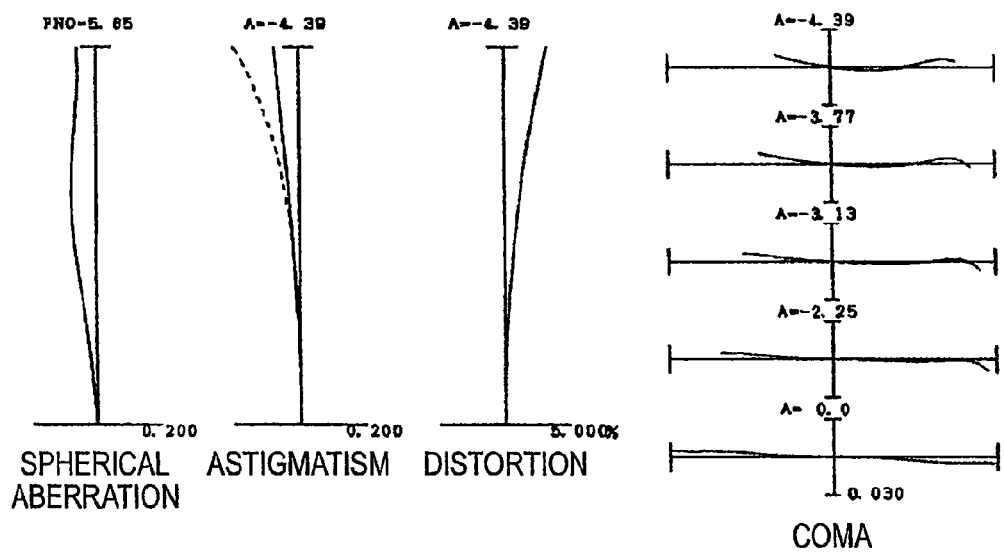
FIG. 9C is an aberration chart in Example 4 in the telephoto end state upon focusing at infinity.

FIGS. 9A to 9C are aberration charts showing various aberrations of Example 4 at d-line (λ=587.6 nm). FIG. 9A is an aberration chart upon focusing at infinity in the wide-angle end state (f=30.00 mm). FIG. 9B is an aberration chart upon focusing at infinity in the intermediate focal length state (f=65.50 mm). FIG. 9C is an aberration chart upon focusing at infinity in the telephoto end state (f=107.09 mm). The aberration charts indicate that various aberrations are favorably corrected in each focal length state from the wide-angle end state to the telephoto end state, whereby Example 4 has excellent imaging performances.

Example 5

FIG. 10 is a view showing the structure of the zoom lens system ZL5 in accordance with Example 5 of the present invention. In the zoom lens system ZL5 of FIG. 10, the first lens group G1 is composed, in order from the object, of a first-a partial lens group G1a and a first-b partial lens group G1b; the first-a partial lens group G1a is constituted by a double convex lens L11; and the first-b partial lens group G1b is made of a cemented positive lens constructed by cementing a negative meniscus lens L12 having a concave surface facing the object and a double convex lens L13 together. The second lens group G2 is composed, in order from the object, of a negative meniscus lens L21 having a convex surface facing the object, a cemented negative lens constructed by cementing a double concave lens L22 and a double convex lens L23 together, and a negative meniscus lens L24 having a concave surface facing the object. The third lens group G3 is composed, in order from the object, of a third-a partial lens group G3a and a third-b partial lens group G3b; the third-a partial lens group G3a is composed of a double convex lens L31, a cemented negative lens constructed by cementing a double convex lens L32 and a double concave lens L33 together, and a double convex lens L34; and the third-b partial lens group G3b is composed of a cemented negative lens constructed by cementing a double concave lens L35 and a double convex lens L36 together and a negative meniscus lens L37 having a concave surface facing the object. Further, a filter group FL is constructed by a low-pass filter, an infrared cut filter, and the like. An aperture stop S is arranged closest to the object in the third lens group G3, and moves together with the third lens group G3 at the time of zooming from the wide-angle end state to the telephoto end state.

The following Table 14 lists values of data in Example 5.

TABLE 14

|  | W |  | IF |  | T |
|---|---|---|---|---|---|
| f = | 30.00 | ~ | 65.50 | ~ | 107.09 |
| F. NO = | 4.11 | ~ | 4.72 | ~ | 5.63 |
| 2ω = | 31.94 | ~ | 14.25 | ~ | 8.79 |
| IH = | 8.50 | ~ | 8.50 | ~ | 8.50 |
| TLL = | 75.50 | ~ | 95.02 | ~ | 104.52 |

| s | r | d | n | ν |
|---|---|---|---|---|
| 1 | 227.3101 | 1.62 | 1.51680 | 64.10 |
| 2 | −227.3101 | 4.72 |  |  |
| 3 | 39.0309 | 0.80 | 1.78470 | 26.29 |
| 4 | 27.4849 | 3.00 | 1.49782 | 82.52 |
| 5 | −296.1941 | (d5) |  |  |
| 6 | 176.0290 | 0.80 | 1.69680 | 55.53 |
| 7 | 23.2355 | 1.15 |  |  |
| 8 | −31.8792 | 0.80 | 1.69680 | 55.53 |
| 9 | 18.2337 | 1.96 | 1.84666 | 23.78 |
| 10 | −194.3960 | 1.00 |  |  |
| 11 | −17.4270 | 0.80 | 1.72916 | 54.68 |
| 12 | −262.9406 | (d12) |  |  |
| 13 | 0.0000 | 0.50 | (aperture stop S) |  |
| 14 | 148.4542 | 2.17 | 1.60300 | 65.44 |
| 15 | −21.3098 | 0.10 |  |  |
| 16 | 21.4676 | 3.22 | 1.49700 | 81.54 |
| 17 | −15.4535 | 0.80 | 1.80384 | 33.89 |
| 18 | 86.3565 | 0.10 |  |  |
| 19 | 14.5468 | 2.70 | 1.61800 | 63.33 |
| 20 | −94.3058 | 8.91 |  |  |
| 21 | −30.7082 | 0.89 | 1.74400 | 44.79 |
| 22 | 7.2820 | 3.50 | 1.61293 | 37.00 |
| 23 | −16.5601 | 1.29 |  |  |
| 24 | −8.4090 | 1.01 | 1.75500 | 52.32 |
| 25 | −13.6611 | (d25) |  |  |
| 26 | 0.0000 | 1.00 | 1.51680 | 64.12 |
| 27 | 0.0000 | 1.50 |  |  |
| 28 | 0.0000 | 1.87 | 1.51680 | 64.12 |
| 29 | 0.0000 | 0.40 |  |  |

TABLE 14-continued

| 30 | 0.0000 | 0.70 | 1.51680 | 64.12 |
| 31 | 0.0000 | (Bf) | | |

Focal length of lens group

| Group | Initial surface | Focal length |
|---|---|---|
| 1 | 1 | 63.8324 |
| 2 | 6 | −12.6553 |
| 3 | 14 | 14.8909 |

In Example 5, the axial air space d5 between the first and second lens groups G1, G2, the axial air space d12 between the second and third lens groups G2, G3, the axial air space d25 between the third lens group G3 and filter group FL, and the back focus Bf vary during zooming. The following Table 15 lists variable spaces at infinity at respective focal lengths in the wide-angle end, intermediate focal length, and telephoto end states.

TABLE 15

| | W | IF | T |
|---|---|---|---|
| f | 30.0001 | 65.5003 | 107.0906 |
| d5 | 2.0000 | 20.6855 | 20.3023 |
| d12 | 9.6995 | 5.0515 | 1.5000 |
| d25 | 15.9954 | 21.4733 | 28.9089 |
| Bf | 0.5001 | 0.5002 | 0.5002 |

The following Table 16 lists values corresponding to the conditional expressions in Example 5.

TABLE 16

| fw = 30.0001 |
| f1 = 63.8324 |
| f1a = 220.1876 |
| f1b = 87.7682 |
| f2 = −12.6553 |
| f3 = 14.8909 |
| (1)f1b/f1a = 0.3986 |
| (2)f1/fw = 2.1277 |
| (3)f1b/f1 = 1.3750 |
| (4)f1/(−f2) = 5.0439 |
| (5)f1/f3 = 4.2867 |

Figure 11A:
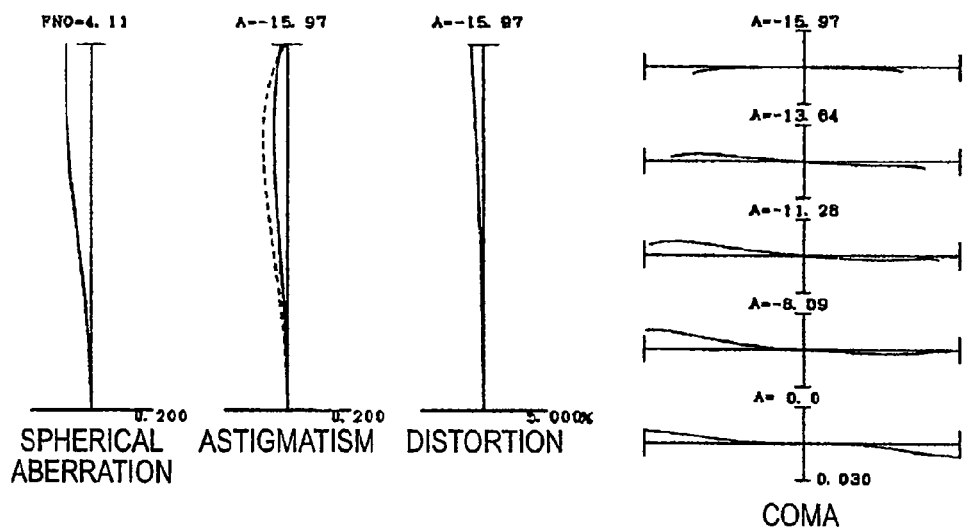
FIG. 11A is an aberration chart in Example 5 in the wide-angle end state upon focusing at infinity.
Figure 11B:
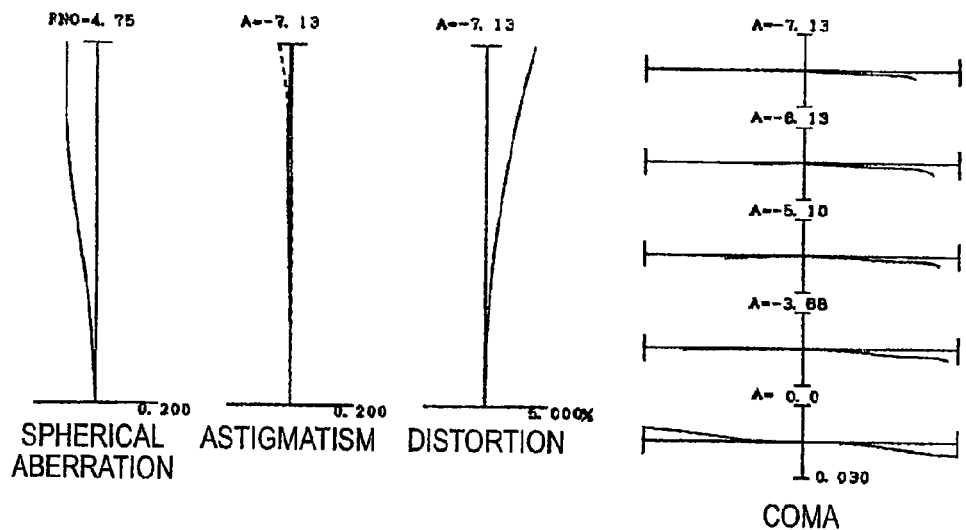
FIG. 11B is an aberration chart in Example 5 in the intermediate focal length state upon focusing at infinity.
Figure 11C:
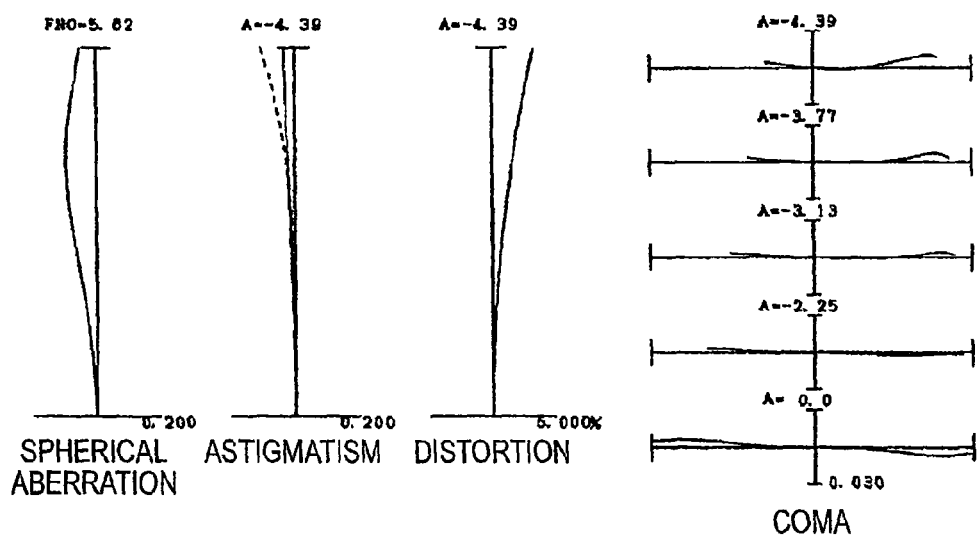
FIG. 11C is an aberration chart in Example 5 in the telephoto end state upon focusing at infinity.

FIGS. 11A to 11C are aberration charts showing various aberrations of Example 5 at d-line ($\lambda$=587.6 nm). FIG. 11A is an aberration chart upon focusing at infinity in the wide-angle end state (f=30.00 mm). FIG. 11B is an aberration chart upon focusing at infinity in the intermediate focal length state (f=65.50 mm). FIG. 11C is an aberration chart upon focusing at infinity in the telephoto end state (f=107.09 mm). The aberration charts indicate that various aberrations are favorably corrected in each focal length state from the wide-angle end state to the telephoto end state, whereby Example 5 has excellent imaging performances.

Example 6

Figure 12:
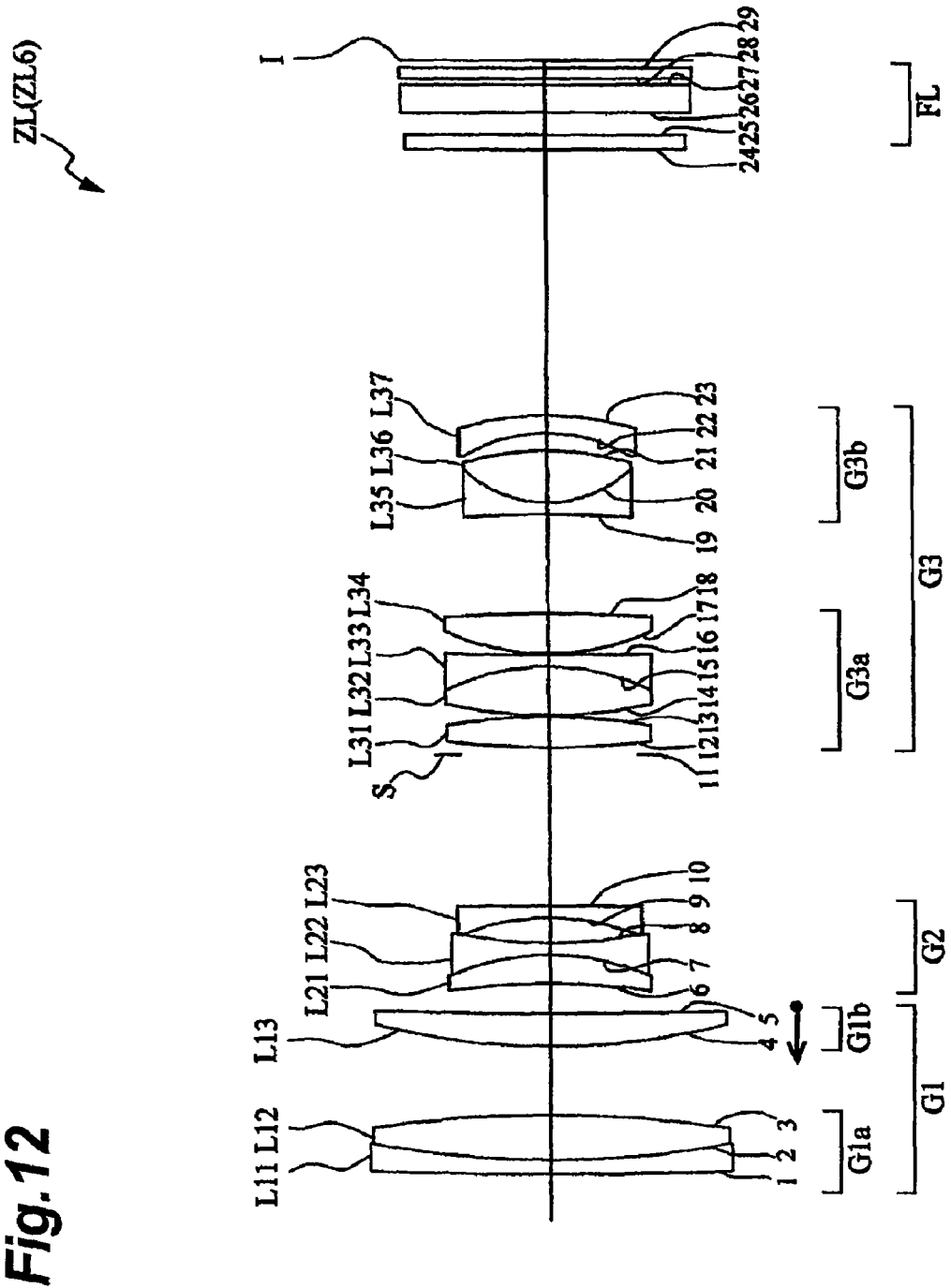
FIG. 12 is a sectional view showing the structure of the zoom lens system in accordance with Example 6.

FIG. 12 is a view showing the structure of the zoom lens system ZL6 in accordance with Example 6 of the present invention. In the zoom lens system ZL6 of FIG. 12, the first lens group G1 is composed, in order from the object, of a first-a partial lens group G1a and a first-b partial lens group G1b; the first-a partial lens group G1a is made of a cemented positive lens constructed by cementing a negative meniscus lens L11 having a convex surface facing the object and a double convex lens L12 together; and the first-b partial lens group G1b is constituted by a positive meniscus lens L13 having a convex surface facing the object. The second lens group G2 is composed, in order from the object, of a cemented negative lens constructed by cementing a negative meniscus lens L21 having a concave surface facing the object and a double concave lens L22 together and a negative meniscus lens L23 having a concave surface facing the object. The third lens group G3 is composed, in order from the object, of a third-a partial lens group G3a and a third-b partial lens group G3b; the third-a partial lens group G3a is composed of a double convex lens L31, a cemented negative lens constructed by cementing a double convex lens L32 and a double concave lens L33 together, and a double convex lens L34; and the third-b partial lens group G3b is composed of a cemented negative lens constructed by cementing a double concave lens L35 and a double convex lens L36 together and a negative meniscus lens L37 having a concave surface facing the object. Further, a filter group FL is constructed by a low-pass filter, an infrared cut filter, and the like. An aperture stop S is arranged closest to the object in the third lens group G3, and moves together with the third lens group G3 at the time of zooming from the wide-angle end state to the telephoto end state.

The following Table 17 lists values of data in Example 6.

TABLE 17

| | W | | IF | | T |
|---|---|---|---|---|---|
| f = | 30.00 | ~ | 66.44 | ~ | 107.09 |
| F. NO = | 4.16 | ~ | 4.89 | ~ | 5.68 |
| 2$\omega$ = | 31.94 | ~ | 14.05 | ~ | 8.79 |
| IH = | 8.50 | ~ | 8.50 | ~ | 8.50 |
| TLL = | 75.00 | ~ | 95.74 | ~ | 105.00 |

| s | r | d | n | $\nu$ |
|---|---|---|---|---|
| 1 | 273.7117 | 0.95 | 1.83400 | 37.16 |
| 2 | 55.6806 | 3.00 | 1.49782 | 82.52 |
| 3 | −68.2296 | 4.57 | | |
| 4 | 40.7804 | 2.21 | 1.49782 | 82.52 |
| 5 | 389.8809 | (d5) | | |
| 6 | −37.6582 | 1.92 | 1.84666 | 23.78 |
| 7 | −13.8724 | 0.80 | 1.56384 | 60.66 |
| 8 | 24.1738 | 1.69 | | |
| 9 | −13.0806 | 0.80 | 1.62041 | 60.29 |
| 10 | −322.7438 | (d10) | | |
| 11 | 0.0000 | 0.50 | | (aperture stop S) |
| 12 | 48.0311 | 2.08 | 1.49700 | 81.54 |
| 13 | −33.8610 | 0.10 | | |
| 14 | 26.7689 | 3.28 | 1.60300 | 65.44 |
| 15 | −12.8497 | 0.80 | 1.80384 | 33.89 |
| 16 | 339.1966 | 0.10 | | |
| 17 | 14.2282 | 2.70 | 1.61800 | 63.33 |
| 18 | −74.4328 | 6.70 | | |
| 19 | −60.3246 | 0.80 | 1.83481 | 42.71 |
| 20 | 6.9024 | 3.50 | 1.62004 | 36.26 |
| 21 | −15.8495 | 1.20 | | |
| 22 | −8.8529 | 1.20 | 1.78800 | 47.37 |
| 23 | −16.7933 | (d23) | | |
| 24 | 0.0000 | 1.00 | 1.51680 | 64.12 |
| 25 | 0.0000 | 1.50 | | |
| 26 | 0.0000 | 1.87 | 1.51680 | 64.12 |
| 27 | 0.0000 | 0.40 | | |
| 28 | 0.0000 | 0.70 | 1.51680 | 64.12 |
| 29 | 0.0000 | (Bf) | | |

Focal length of lens group

| Group | Initial surface | Focal length |
|---|---|---|
| 1 | 1 | 66.0533 |
| 2 | 6 | −13.5128 |
| 3 | 12 | 15.2087 |

In Example 6, the axial air space d5 between the first and second lens groups G1, G2, the axial air space d10 between the second and third lens groups G2, G3, the axial air space d23 between the third lens group G3 and filter group FL, and the back focus Bf vary during zooming. The following Table 18 lists variable spaces at infinity at respective focal lengths in the wide-angle end, intermediate focal length, and telephoto end states.

TABLE 18

|     | W       | IF      | T        |
|-----|---------|---------|----------|
| f   | 29.9999 | 66.4434 | 107.0887 |
| d5  | 2.0000  | 21.6530 | 27.9021  |
| d10 | 10.2160 | 5.1472  | 1.5000   |
| d23 | 17.9247 | 24.0759 | 30.7380  |
| Bf  | 0.4998  | 0.4999  | 0.4999   |

The following Table 19 lists values corresponding to the conditional expressions in Example 6.

TABLE 19

| fw = 29.9999 |
|---|
| f1 = 66.0533 |
| f1a = 230.0345 |
| f1b = 91.2951 |
| f2 = −13.5128 |
| f3 = 15.2087 |
| (1) f1b/f1a = 0.3969 |
| (2) f1/fw = 2.2018 |
| (3) f1b/f1 = 1.3821 |
| (4) f1/(−f2) = 4.8882 |
| (5) f1/f3 = 4.3431 |

Figure 13A:
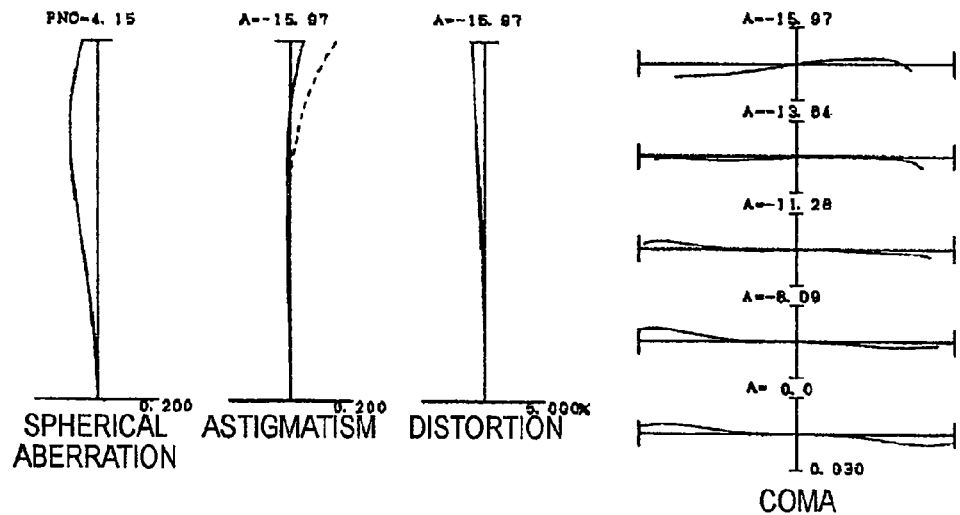
FIG. 13A is an aberration chart in Example 6 in the wide-angle end state upon focusing at infinity.
Figure 13B:
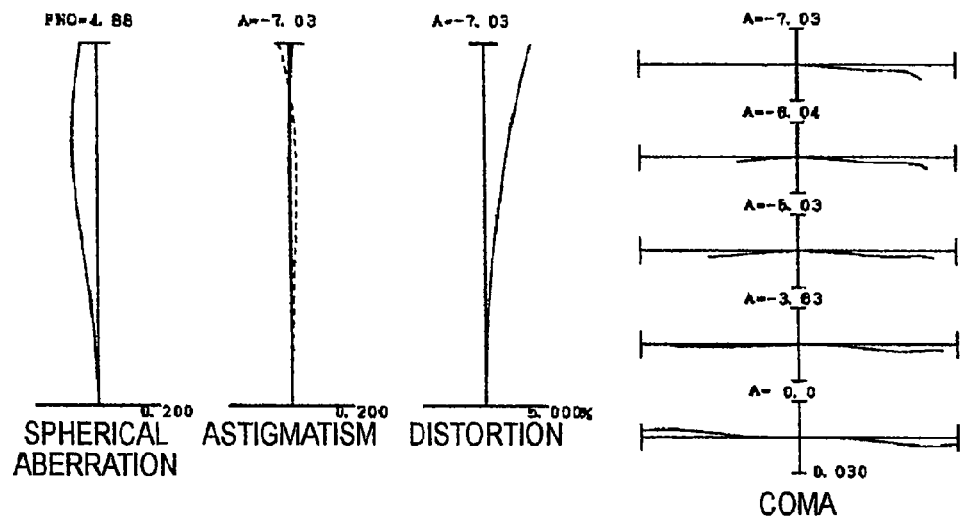
FIG. 13B is an aberration chart in Example 6 in the intermediate focal length state upon focusing at infinity.

FIGS. 13A to 13C are aberration charts showing various aberrations of Example 5 at d-line ($\lambda$=587.6 nm). FIG. 13A is an aberration chart upon focusing at infinity in the wide-angle end state (f=30.00 mm). FIG. 13B is an aberration chart upon focusing at infinity in the intermediate focal length state (f=66.44 mm). FIG. 13C is an aberration chart upon focusing at infinity in the telephoto end state (f=107.09 mm). The aberration charts indicate that various aberrations are favorably corrected in each focal length state from the wide-angle end state to the telephoto end state, whereby Example 6 has excellent imaging performances.

Preferably, in the optical system (zoom lens system) accordance with the embodiment, the distance (back focus) on the optical axis from the image-side surface of the lens component arranged closest to the image to the image surface in the shortest state is about 10 to 30 mm. In the optical system (zoom lens system) in accordance with the embodiment, the image height is preferably 5 to 12.5 mm, more preferably 5 to 9.5 mm.

The invention is not limited to the fore going embodiments but various changes and modifications of its components may be made without departing from the scope of the present invention. Also, the components disclosed in the embodiments may be assembled in any combination for embodying the present invention. For example, some of the components may be omitted from all components disclosed in the embodiments. Further, components in different embodiments may be appropriately combined.

What is claimed is:

1. A zoom lens system comprising, in order from an object:
a first lens group having a positive refractive power;
a second lens group having a negative refractive power; and
a third lens group having a positive refractive power;
wherein the first lens group has a first-a partial lens group and a first-b partial lens group arranged on an image side of the first-a partial lens group with an air space and is constructed such that the first-b partial lens group moves along an optical axis direction upon focusing from infinity to a close-range object;
wherein the third lens group comprises a third-a partial lens group having a positive refractive power and a third-b partial lens group having a negative refractive power arranged on the image side of the third-a partial lens group with an air space, and
wherein the following conditional expression is satisfied:

$2.0126 \leq f1/fw < 2.6$ where f1 denotes a focal length of the first lens group, and fw denotes a focal length of the whole system at a wide-angle end state.

2. A zoom lens system according to claim 1, wherein the following conditional expression is satisfied:

$0.17 < |f1b|/|f1a| < 0.51$ where f1a denotes a focal length of the first-a partial lens group, and f1b denotes a focal length of the first-b partial lens group.

3. A zoom lens system according to claim 1, wherein an image-side surface of a lens component arranged closest to an image is distanced from an image plane by at least 10 mm but not more than 30 mm.

4. A zoom lens system according to claim 1, wherein the following conditional expression is satisfied:

$1.15 < |f1b|/f1 < 1.50$ where f1 denotes a focal length of the first lens group, and f1b denotes a focal length of the first-b partial lens group.

5. A zoom lens system according to claim 1, wherein the first-a partial lens group in the first lens group is stationary with respect to an image plane upon focusing from a close-range object to infinity.

6. A zoom lens system according to claim 1, wherein the first-a partial lens group in the first lens group has a positive refractive power.

7. A zoom lens system according to claim 1, wherein the first-b partial lens group in the first lens group has a positive refractive power.

8. A zoom lens system according to claim 1, wherein the following conditional expression is satisfied:

$2.73 < f1/(−f2) < 6.20$ where f2 denotes a focal length of the second lens group.

9. A zoom lens system according to claim 1, wherein the following conditional expression is satisfied:

$2.74 < f1/f3 < 5.14$ where f3 denotes a focal length of the third lens group.

10. A zoom lens system according to claim 1, wherein the third-b partial lens group in the third lens group comprises, in order from the object, a cemented negative lens and a negative lens.

11. A zoom lens system according to claim 10, wherein the negative lens in the third-b partial lens group in the third lens group is a negative meniscus lens having a convex surface facing the image.

12. A zoom lens system according to claim 1, wherein at least the first and third lens groups move toward the object upon zooming from a wide-angle end state to a telephoto end state.

13. A zoom lens system according to claim 1, wherein, upon zooming from a wide-angle end state to a telephoto end state, a distance between the first and second lens groups increases while a distance between the second and third lens groups decreases.

14. An optical device including the zoom lens system according to claim 1 for forming an image of the object onto a predetermined image plane.

15. A method of manufacturing a zoom lens system, the method comprising the steps of:
arranging, in order from an object, a first lens group having a positive refractive power and including a first-a partial lens group and a first-b partial lens group arranged on an image side of the first-a partial lens group with an air space, a second lens group having a negative refractive power, and a third lens group having a positive refractive power; and
verifying a focusing action of moving the first-b partial lens group along an optical axis direction, the first-b partial lens group being adapted to focus from infinity to a close-range object;
wherein the third lens group comprises a third-a partial lens group and a third-b partial lens group arranged on the image side of the third-a partial lens group with an air space;
wherein the third-a partial lens group in the third lens group has a positive refractive power;
wherein the third-b partial lens group in the third lens group has a negative refractive power; and
wherein the following conditional expression is satisfied:

$$2.0126 \leq f1/fw < 2.6$$

where f1 denotes a focal length of the first lens group, and fw denotes a focal length of the whole system at a wide-angle end state.

* * * * *